US008094326B2

(12) United States Patent
Inui

(10) Patent No.: US 8,094,326 B2
(45) Date of Patent: Jan. 10, 2012

(54) IMAGE PROCESSING APPARATUS, JOB PROCESSING METHOD, STORING MEDIUM, AND PROGRAM

(75) Inventor: Masanobu Inui, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1161 days.

(21) Appl. No.: 11/850,485

(22) Filed: Sep. 5, 2007

(65) Prior Publication Data

US 2008/0062458 A1 Mar. 13, 2008

(30) Foreign Application Priority Data

Sep. 8, 2006 (JP) ................................ 2006-243891

(51) Int. Cl.
*G06K 15/00* (2006.01)
*G06K 15/02* (2006.01)
*G06F 3/12* (2006.01)

(52) U.S. Cl. ..................... 358/1.12; 358/1.11; 358/1.13; 358/1.14; 358/1.15; 358/1.1

(58) Field of Classification Search .................. 400/582; 358/1.1, 1.11–1.15, 498
See application file for complete search history.

(56) References Cited

U.S. PATENT DOCUMENTS

| | | | | |
|---|---|---|---|---|
| 6,914,687 | B1 * | 7/2005 | Hosoda et al. | 358/1.1 |
| 6,971,809 | B1 * | 12/2005 | Housel et al. | 400/582 |
| 7,061,636 | B2 * | 6/2006 | Ryan et al. | 358/1.15 |
| 2004/0100653 | A1 * | 5/2004 | Azami | 358/1.15 |
| 2005/0105146 | A1 * | 5/2005 | Tanaka | 358/498 |

* cited by examiner

*Primary Examiner* — Mark K Zimmerman
*Assistant Examiner* — Satwant Singh
(74) *Attorney, Agent, or Firm* — Canon USA, Inc., I.P. Division

(57) ABSTRACT

An image processing apparatus executes an image process by using a sheet feeding unit or a sheet discharging unit selected from a plurality of sheet feeding units and sheet discharging units. The image processing apparatus stores attribute information for specifying one of the sheet feeding units or one of the sheet discharging units to correspond to an application generating a print job and controls a selection of one of the sheet feeding units or one of the sheet discharging units so as to execute a print job based on the stored attribute information.

16 Claims, 22 Drawing Sheets

FIG. 10

1001 1002 1003 1004

| ATTRIBUTE ID | TYPE ID | VALUE | MEANING |
|---|---|---|---|
| 10 | 1 | ARBITRARY CHARACTER STRING | JOB NAME |
| 11 | 1 | ARBITRARY CHARACTER STRING | APPLICATION NAME |
| 100 | 2 | 1, 2, 3, 4, 5 | CASSETTE STAGE |
| 101 | 2 | 1, 2, 3, 4 | DISCHARGE STAGE |
| 104 | 2 | 3 | THE NUMBER OF COPIES |
| ⋮ | ⋮ | ⋮ | ⋮ |
| 401 | 11 | 0 TO 7015, 0 TO 9920 | IMAGE SIZE |
| 402 | 11 | 0 TO 7015, 0 TO 9920 | MOVEMENT AMOUNT |
| 403 | 2 | 1, 2, 3 | DUPLEX |
| 404 | 2 | 1, 2, 3, 4 | BINDING POSITION |

FIG. 11

JOB SUBSTANCE 1101 1102 1103 1104

| ATTRIBUTE ID | STATE | VALUE | MEANING |
|---|---|---|---|
| 100 | DEDICATED | 1 | CASSETTE STAGE |
| 101 | DEFAULT | 2 | DISCHARGE STAGE |
| 401 | OFF | – | THE NUMBER OF COPIES |
| 402 | OFF | – | MOVEMENT AMOUNT |
| 403 | DEFAULT | 2 | DUPLEX |
| 404 | OFF | – | BINDING MARGIN |
| 405 | EXCEPTION | 1 | TRIAL PRINT |

| FILE NAME |
| --- |
| RECEIPT APPL |
| APPLICATION A |
| APPLICATION B |
| – |
| – |

1501 1502 1503 1504 1506

| PART | DEDICATED FLAG | DEDICATED APPL | ATTRIBUTE ID | ATTRIBUTE VALUE |
|---|---|---|---|---|
| CASSETTE 1 | ON | RECEIPT APPL | 101 | 1 |
| CASSETTE 2 | OFF | – | 101 | 2 |
| CASSETTE 3 | OFF | – | 101 | 3 |
| CASSETTE 4 | OFF | – | 101 | 4 |
| BIN 1 | OFF | – | 102 | 1 |
| BIN 2 | OFF | – | 102 | 2 |
| BIN 3 | ON | APPLICATION B | 102 | 3 |
| – | – | – | – | – |

DMT (1) SERIAL No. OF THE RECEIPT
(2) ADDRESS OF THE COMPANY
(3) PRICE
(4) NAME OF RECIPIENT
(5) DATE

FIG. 17C

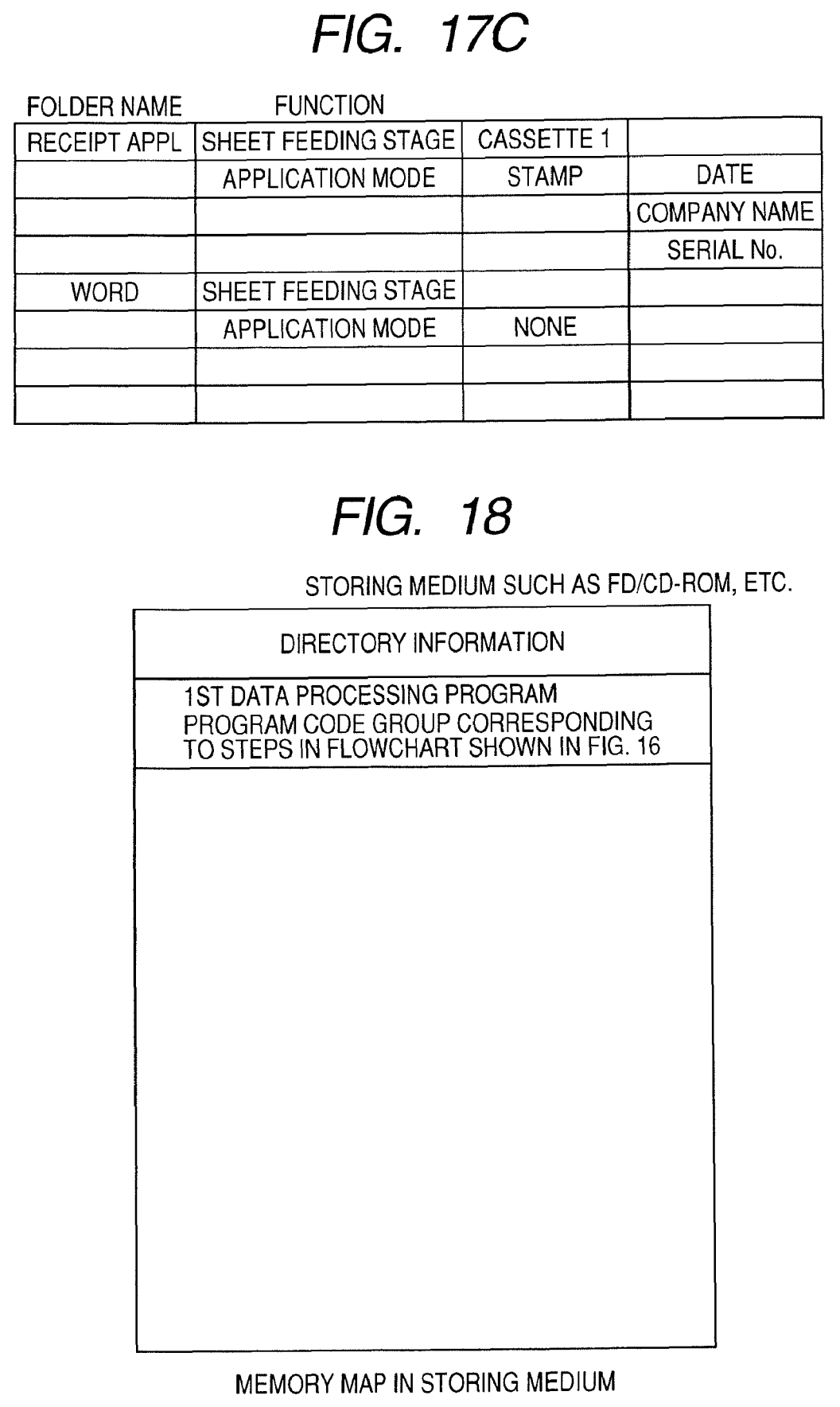

| FOLDER NAME | FUNCTION | | |
|---|---|---|---|
| RECEIPT APPL | SHEET FEEDING STAGE | CASSETTE 1 | |
| | APPLICATION MODE | STAMP | DATE |
| | | | COMPANY NAME |
| | | | SERIAL No. |
| WORD | SHEET FEEDING STAGE | | |
| | APPLICATION MODE | NONE | |
| | | | |
| | | | |

FIG. 18

STORING MEDIUM SUCH AS FD/CD-ROM, ETC.

| |
|---|
| DIRECTORY INFORMATION |
| 1ST DATA PROCESSING PROGRAM<br>PROGRAM CODE GROUP CORRESPONDING TO STEPS IN FLOWCHART SHOWN IN FIG. 16 |
| |

MEMORY MAP IN STORING MEDIUM

IMAGE PROCESSING APPARATUS, JOB PROCESSING METHOD, STORING MEDIUM, AND PROGRAM

BACKGROUND OF THE INVENTION

1. Field of the Invention

The present invention relates to processes of an image processing apparatus for executing an image process by using resources.

2. Description of the Related Art

In recent years, in a digital hybrid apparatus (multifunction printer), such a function that a specific sheet discharge tray is used only for one of a PDL job and a copy job, thereby preventing such a situation that sheets of printed matter of different job types are mixedly output onto the same discharge tray and improving use efficiency of the user has been known. There is a case where an image processing apparatus such as a digital hybrid apparatus or the like has a plurality of sheet feeding units and a plurality of sheet discharging units as mentioned above. This is because it is necessary to feed the sheet of a size which is required by the user or specify a sheet discharging destination.

As disclosed in Japanese Patent Application Laid-Open No. 2001-043050, as setting information in a printer driver on a host computer, default operation information is stored as favorites of each user. Upon execution of the job, by executing a job by using settings stored a print output using functions of an apparatus can be also obtained without making the annoying setting.

In the digital hybrid apparatus, there is a hybrid apparatus having functions for not only receiving formed print data from the printer driver on the host computer but also directly receiving a file on the host computer, analyzing the received file, and forming print data which can be printed by a print unit. Among the hybrid apparatuses which operate in what is called an application platform (Multifunctional Embedded Application Platform) environment, an apparatus in which a file formed by an application of a client side is directly received and the received file is converted into print data which can be printed has also been proposed.

However, according to the foregoing functions provided at present, the operation can be changed only on a job unit basis such as copy job or PDL job.

Therefore, for example, when the PDL job is input from the application, if the apparatus has a plurality of cassettes as sheet resources of the hybrid apparatus, the following setting cannot be made. For example, such a setting that when the PDL job is input from an application 1, a cassette 1 is used, and when the PDL job is input from an application 2, a cassette 2 is used cannot be made.

Therefore, in the case where dedicated sheets which are used by the application 1 are set into the cassette 1 and dedicated sheets which are used by the application 2 are set into the cassette 2, only one setting can be made as a PDL job. Consequently, such a setting that when the application 1 is used, the cassette 1 is used as a default and when the application 2 is used, the cassette 2 is used as a default cannot be made. There is such an inconvenience that it is necessary to certainly select the cassette which is used on the application side. Such a problem occurs not only in a sheet feeding unit but also in a sheet discharging unit.

In the image processing apparatus having a plurality of sheet feeding units and a plurality of sheet discharging units as mentioned above, any one of the sheet feeding units and the sheet discharging units cannot be allocated to a specific application. Therefore, when considering a system in which sheets which are used are enclosed into a dedicated cassette in correspondence to a specific application, according to the present driver setting, such a troublesome operation that a sheet discharge selecting unit of each client is set again every setting is indispensable.

Therefore, if the number of clients increases, the setting changing operation of a driver environment of an administrator is very annoying and is not practical.

SUMMARY OF THE INVENTION

According to an aspect of the invention, there is provided an image processing apparatus for executing an image process by using a sheet feeding unit or a sheet discharging unit selected from a plurality of sheet feeding units or a plurality of sheet discharging units, comprising: a forming unit adapted to form a print job by using an application; a storing unit adapted to store attribute information for specifying the sheet feeding unit or the sheet discharging unit so as to correspond to the application; and a control unit adapted to control the selection of the sheet feeding unit or the sheet discharging unit so as to output the print job based on the attribute information stored in the storing unit.

Further features of the present invention will become apparent from the following description of exemplary embodiments with reference to the attached drawings.

BRIEF DESCRIPTION OF THE DRAWINGS

FIG. 10 is a diagram illustrating details of a main section of the internal structure of the data serving as a substance of the job shown in FIG. 9.

FIG. 11 is a diagram illustrating an example of a default setting attribute table which can be set by the image processing apparatus according to an embodiment.

FIG. 17C is a diagram for describing the application mode allocation processing operation which is executed by the image processing apparatus according to the second embodiment of the invention.

FIG. 18 is a diagram for describing a memory map in a storing medium for storing various data processing programs which can be read out by the image processing apparatus according to an embodiment the invention.

DESCRIPTION OF THE EMBODIMENTS

An exemplary embodiment for embodying the invention will now be described with reference to the drawings.

<Description of System Construction>

First Embodiment

Embodiments according to the invention will be described in detail hereinbelow with reference to the drawings.

Figure 1:
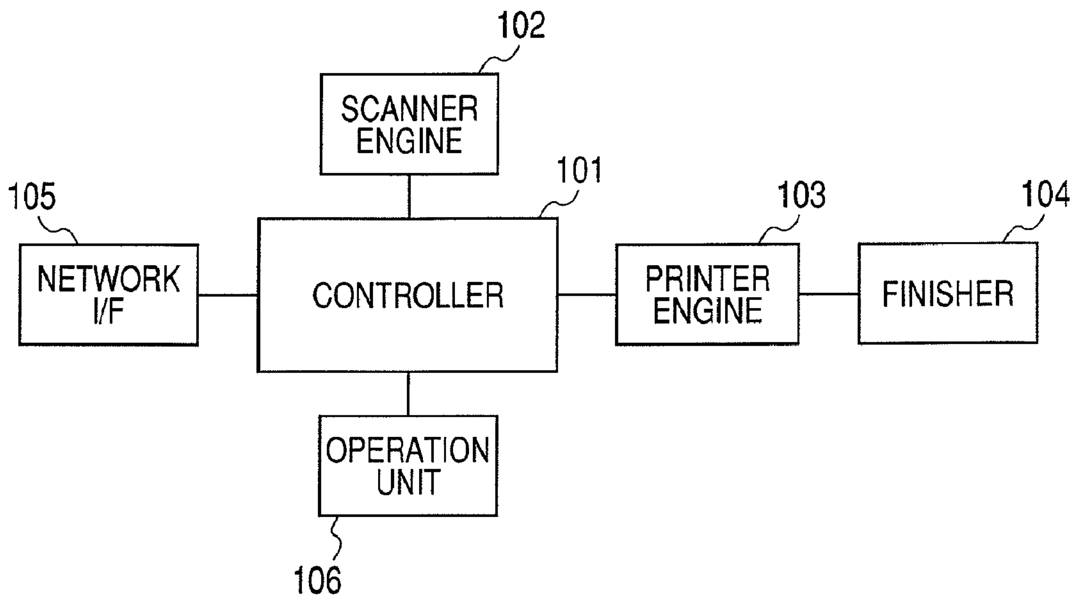
FIG. 1 is a block diagram illustrating a construction of a multi-function peripheral (MFP) according to an embodiment of the invention.

FIG. 1 is a block diagram illustrating a construction of a multi-function peripheral (MFP) as an example of an image processing apparatus according to an embodiment of the invention. The MFP indicates a Multi-Function Peripheral here. The MFP also indicates a hybrid apparatus which can operate under the Multifunctional Embedded Application Platform environment as middleware on the image processing apparatus. The hybrid apparatus is constructed in such a manner that a file formed by installed application software can be directly received and processed from a client side. In an embodiment, as an example of resources, an image processing apparatus having a plurality of sheet discharging units and a plurality of sheet feeding units will be described as an example. However, embodiments of the invention can be also applied to the sheet discharging unit or the sheet feeding unit and embodiments of the invention can be also applied to both of them.

General application software is incorporated in the installed application software. In the case of a document processing application, a word processor application, a receipt application, spreadsheet software, and the like are incorporated. Applications other than those applications may be used so long as they can be installed into the Multifunctional Embedded Application Platform.

Figure 2:
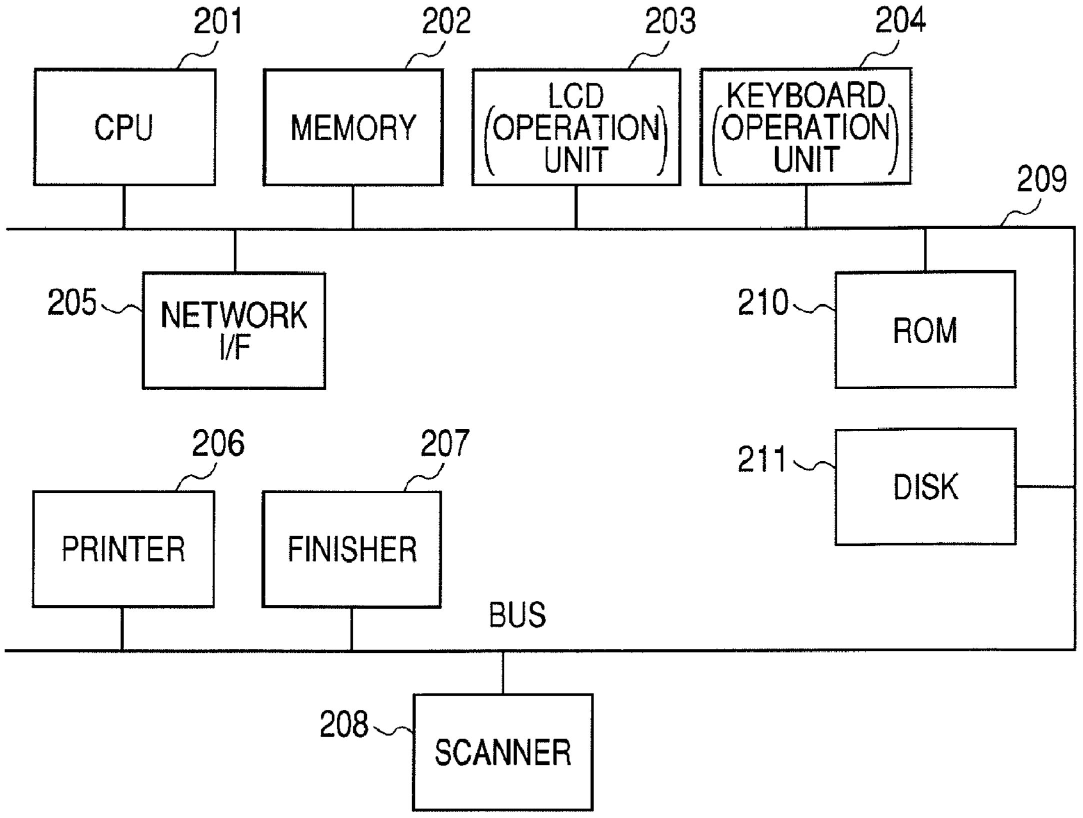
FIG. 2 is a block diagram illustrating a hardware construction of a controller shown in FIG. 1.

In FIG. 1, a controller 101 for controlling multi-function peripherals has a hardware construction illustrated in FIG. 2. The controller 101 may generally include a CPU, a ROM, a RAM, and the like.

A scanner engine 102 is controlled by the controller 101. A laser beam printer engine (hereinbelow, also referred to as a printer engine) 103 is controlled by the controller 101. The printer engine 103 is connected to a finisher 104 and can collectively execute a stapling process or a booklet process to a plurality of recording media (for example, sheets of paper) output from the printer engine 103.

The finisher 104 is also controlled by the controller 101. A network (Ethernet) interface (I/F) 105 provides bidirectional communication to the controller 101 through this interface.

A user interface (UI) 106 is constructed by an LCD display and a keyboard. The UI 106 allows information from the controller 101 to be displayed and transfers an instruction from the user to the controller 101. All functions can be also used from any one of the interfaces such as a network (Ethernet®), TCP/IP) and the like.

FIG. 2 is a block diagram illustrating a hardware construction of the controller 101 shown in FIG. 1.

In FIG. 2, in the controller 101, a memory 202, a liquid crystal display (LCD) 203 and a keyboard 204 constructing the operation unit 106, a ROM 210, and a storing medium (DISK) 211 are connected to a CPU 201 through a bus 209.

Various programs and data have been stored in the DISK (storing medium) 211 such as hard disk, floppy (registered trademark) disk, or the like. They are sequentially read out of the DISK 211 as necessary, stored into the memory 202, and executed by the CPU 201.

The DISK 211 may be a medium which is detachable from the MFP or a medium built in the MFP. Further, the programs may be substituted by programs which are downloaded from another MFP through the network and stored into the DISK 211.

The LCD 203 and the keyboard 204 construct the operation unit 106 shown in FIG. 1. When the CPU 201 writes the data, an image corresponding to the data is displayed on the display 203. When the CPU 201 reads out the data through the keyboard 204, an instruction from the user is input by the operation unit 106.

A network interface 205 is connected to the bus 209 and corresponds to the network interface 105 shown in FIG. 1. When the CPU 201 reads out or writes the data through the I/F 205, communication using the interface is made.

Further, a printer 206, a finisher 207, and a scanner 208 are connected to the bus 209. Those devices correspond to the printer 103, finisher 104, and scanner 102 shown in FIG. 1.

When the CPU 201 reads out or writes the data from/into those engines, the engine operation such as printing, scanning, or the like is executed and various statuses are obtained.

The printer 206, finisher 207, and scanner 208 are not built in the MFP but exist as sole peripheries on the network. They may be controlled by the controller 101 of the MFP.

Figure 3:
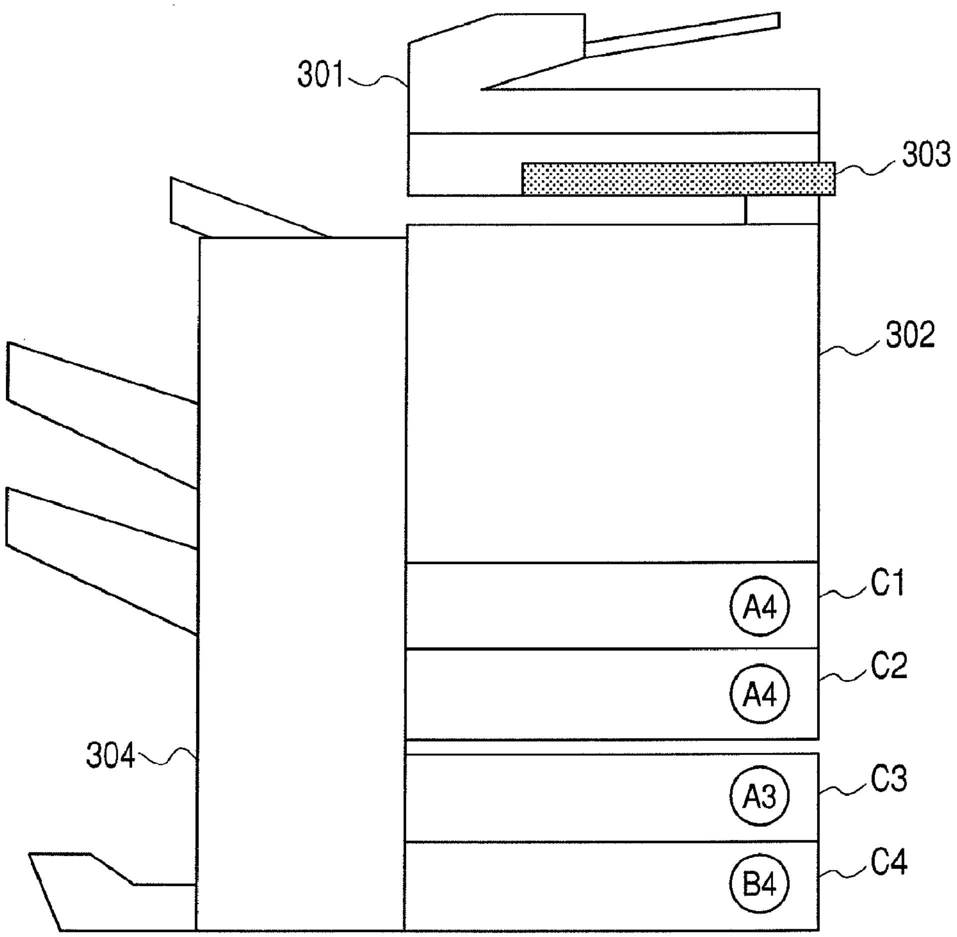
FIG. 3 is a side view illustrating an external appearance of the MFP shown in FIG. 1.

FIG. 3 is a side view illustrating an external appearance of the MFP shown in FIG. 1.

In FIG. 3, a scanner unit 301 as an image input device illuminates an image on the paper serving as an original document and scans a CCD line sensor, thereby reading and converting the image into an electric signal as raster image data. An operation unit 303 is provided.

A printer unit 302 functioning as an image output device converts the raster image data into the image on the paper. The printing operation is activated and stopped by instructions from the controller CPU 201. A finisher unit 304 executes a sheet post-processing function such as sort sheet discharge, group sheet discharge, stapling, or the like to the printed paper.

In an embodiment, the MFP is constructed so that four cassette stages (also simply referred to as cassettes) C1 to C4 can be attached. Sheets of paper of the A4 size are enclosed in the cassette stages C1 and C2. Sheets of paper corresponding to, for example, a bill forming application are enclosed in the cassette stage C1. As for the sheets corresponding to the bill forming application, it is desirable to use paper or the like on which an honorary term of address of an addressee, a title (for example, a receipt, a delivery slip, and a bill), and the like have previously been printed at predetermined positions. Such sheets of paper may be substituted by paper on which a spreadsheet that is formed as a form according to areas set by the user is printed or paper on which a frame of an album or the like has been printed.

In an embodiment, since a specific application has been allocated to the cassette stage C1, if attributes of an input file do not coincide with attributes of the specific application, the cassette stage C1 cannot be selected. In other words, even in the case where a file which designates the cassette stage C1 is input from another application, control to invalidate such designation is made. A specific example of a control method will be described hereinafter.

That is, the cassette C1 functions as a sheet feeding unit in which dedicated recording media allocated to an installable application have been enclosed in one of a plurality of sheet feeding units so that the recording media can be fed. Naturally, the allocating position is not limited only to C1 but can be arbitrarily selected and set by the user.

Sheets of plain paper of the A4 size are enclosed in the cassette stage C2. Sheets of paper of the A3 size are enclosed in the cassette stage C3. Sheets of paper of the B4 size are enclosed in the cassette stage C4.

In an embodiment, when a print job is generated from a specific application based on a control procedure, which will be described hereinafter, the controller 101 controls so that the cassette C1 set by, for example, attribute information is selected from the cassettes C1 to C4.

Figure 4:
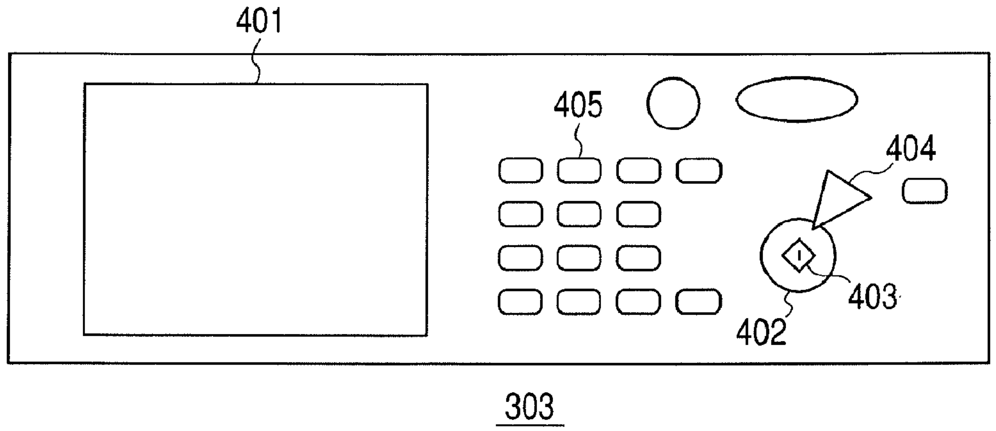
FIG. 4 is a plan view for describing a construction of an operation unit of the MFP shown in FIG. 3.

FIG. 4 is a plan view for describing a construction of the operation unit 303 of the MFP shown in FIG. 3.

In FIG. 4, in a liquid crystal display (LCD) unit 401, a touch panel sheet has been adhered onto the surface of a display screen of the LCD. The LCD unit 401 displays an operation display screen of the system and software keys. When one of the displayed keys is pressed, the LCD unit 401 transmits position information indicative of the position on the display screen corresponding to the pressed key to the controller CPU 201.

A start key 402 is used for the user to start the reading operation of the image on the original, or the like. LEDs 403 of two colors of green and red are arranged at a center position of the start key 402. Whether or not the start key 402 is ready is indicated by the color indication.

A stop key 404 is used for the user to stop the operation which is being executed. A ten-key 405 is constructed by a button group of numerals and characters. The ten-key 405 is used for the user to instruct the setting of the number of copies and switching of the display screen of the LCD unit 401.

Figure 5:
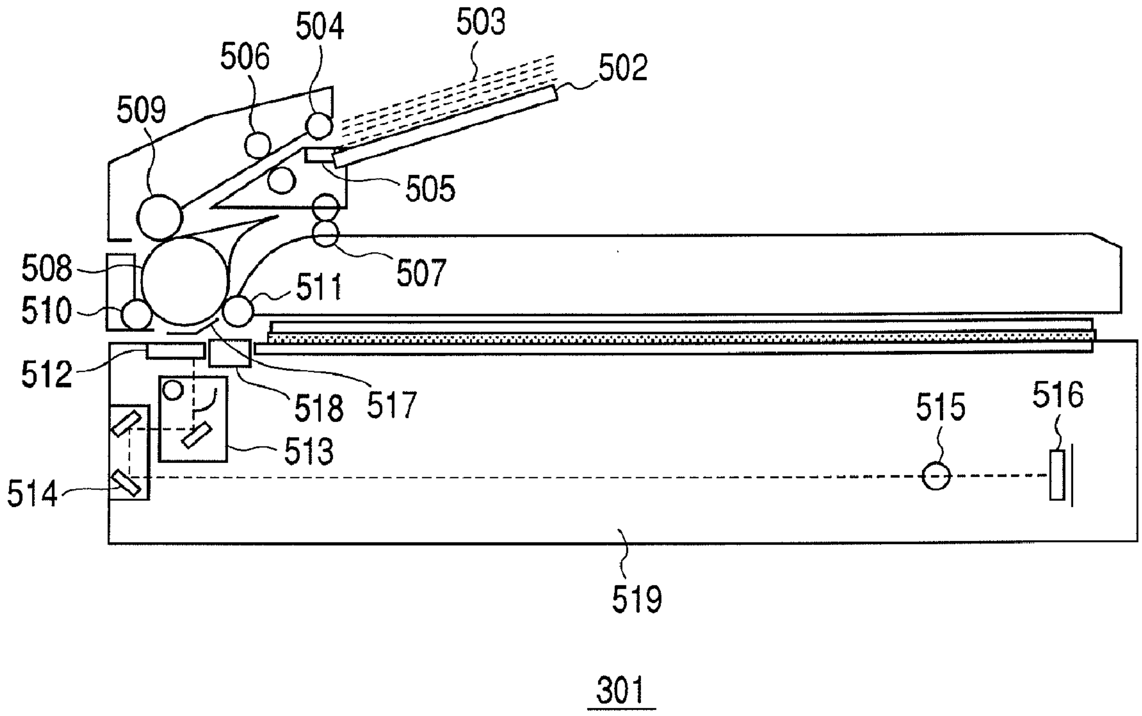
FIG. 5 is a cross sectional view for describing a construction of a scanner unit of the MFP shown in FIG. 3.

FIG. 5 is a cross sectional view for describing a construction of the scanner unit 301 of the MFP shown in FIG. 3.

In FIG. 5, information on an original document 503 is read out while relatively moving the original 503 to an exposing unit 513 of an original reading apparatus 519.

The original 503 is set onto a document tray 502. An original sheet feeding roller 504 and a separating pad 505 are constructed as a pair and convey the original sheets 503 one by one. The conveyed original 503 is fed into the apparatus main body by an intermediate roller 506, conveyed by a large roller 508 and a first driven roller 509, and further conveyed by the large roller 508 and a second driven roller 510.

The original 503 conveyed by the large roller 508 and the second driven roller 510 passes through an interval between a glass plate 512 and an original guide plate 517, passes through a jump board 518, and is conveyed by the large roller 508 and a third driven roller 511. The original 503 conveyed by the large roller 508 and the third driven roller 511 is ejected to the outside of the apparatus main body by an original discharge roller pair 507. In the gap between the glass plate 512 and the original guide plate 517, the original 503 is conveyed so as to be come into contact with the glass plate 512 by the original guide plate 517.

When the original 503 passes on the glass plate 512, the surface of the original which is in contact with the glass plate 512 is exposed by the exposing unit 513. Reflection light from the original 503 which is obtained by the exposure is transferred to a mirror unit 514. The transferred reflection light passes through a lens 515, is converged, and is converted into an electric signal by a CCD sensor unit 516.

Figure 6:
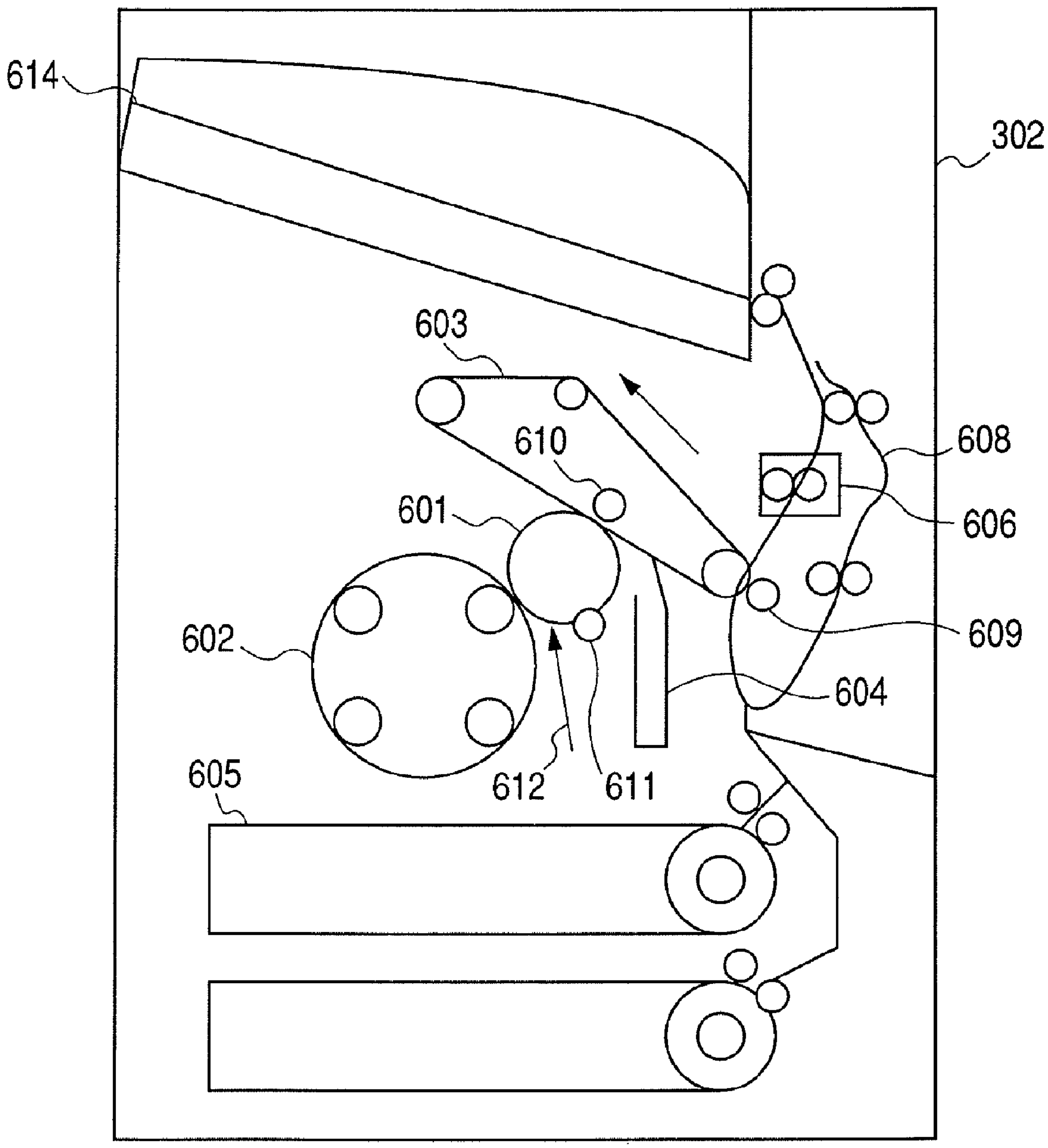
FIG. 6 is a cross sectional view for describing a construction of a printer unit of the MFP shown in FIG. 3.

FIG. 6 is a cross sectional view for describing a construction of the printer unit 302 of MFP shown in FIG. 3. In this example, a full-color image is formed by a method whereby electrostatic latent images exposed onto a photosensitive drum of a 1-drum type are sequentially overlapped and transferred by using a plurality of kinds of color toner. The printer engine is not limited to the 1-drum type but can be also replaced by the printer unit 302 having a printer engine for forming a color image by a 4-drum type. FIG. 6 illustrates the sheet feeding unit of an example having the two cassettes. Optional cassettes other than those cassettes can be further piled and attached to the apparatus main body.

In FIG. 6, a photosensitive drum 601 is charged to an electric potential of a specific polarity by a primary charging device 611. A position shown by an arrow 612 of the photosensitive drum 601 is exposed by an exposing unit (not shown). In this manner, the electrostatic latent image corresponding to the first color component is formed. After that, the latent image is developed by using one of four developing apparatuses 602.

An intermediate transfer belt 603 is driven in the direction shown by an arrow. While an image of the first color component formed on the photosensitive drum passes through a joint portion of the photosensitive drum and the intermediate transfer belt, the first color component image is transferred onto the intermediate transfer belt by an electric field formed by a primary transfer roller 610.

The surface of the photosensitive drum after completion of the image transfer onto the intermediate transfer belt is cleaned by a cleaning apparatus 604. By sequentially repeating such a process, images of four colors are overlaid onto the intermediate transfer belt, thereby forming the color image. In the case of forming the image of a monochromatic color, the transferring process is executed only once.

The image transferred onto the intermediate transfer belt 603 is printed by a secondary transfer roller 609 portion onto the sheet of paper fed from a cassette 605. The image-printed sheet is heated and fixed by a fixing apparatus 606. After the fixing, the sheet is conveyed to a sheet discharge port 614 and ejected to the outside of the apparatus main body. In the case of executing duplex printing, the sheet is circulated by passing through a reversing path 608 and the printing process is repeated.

Figure 7:
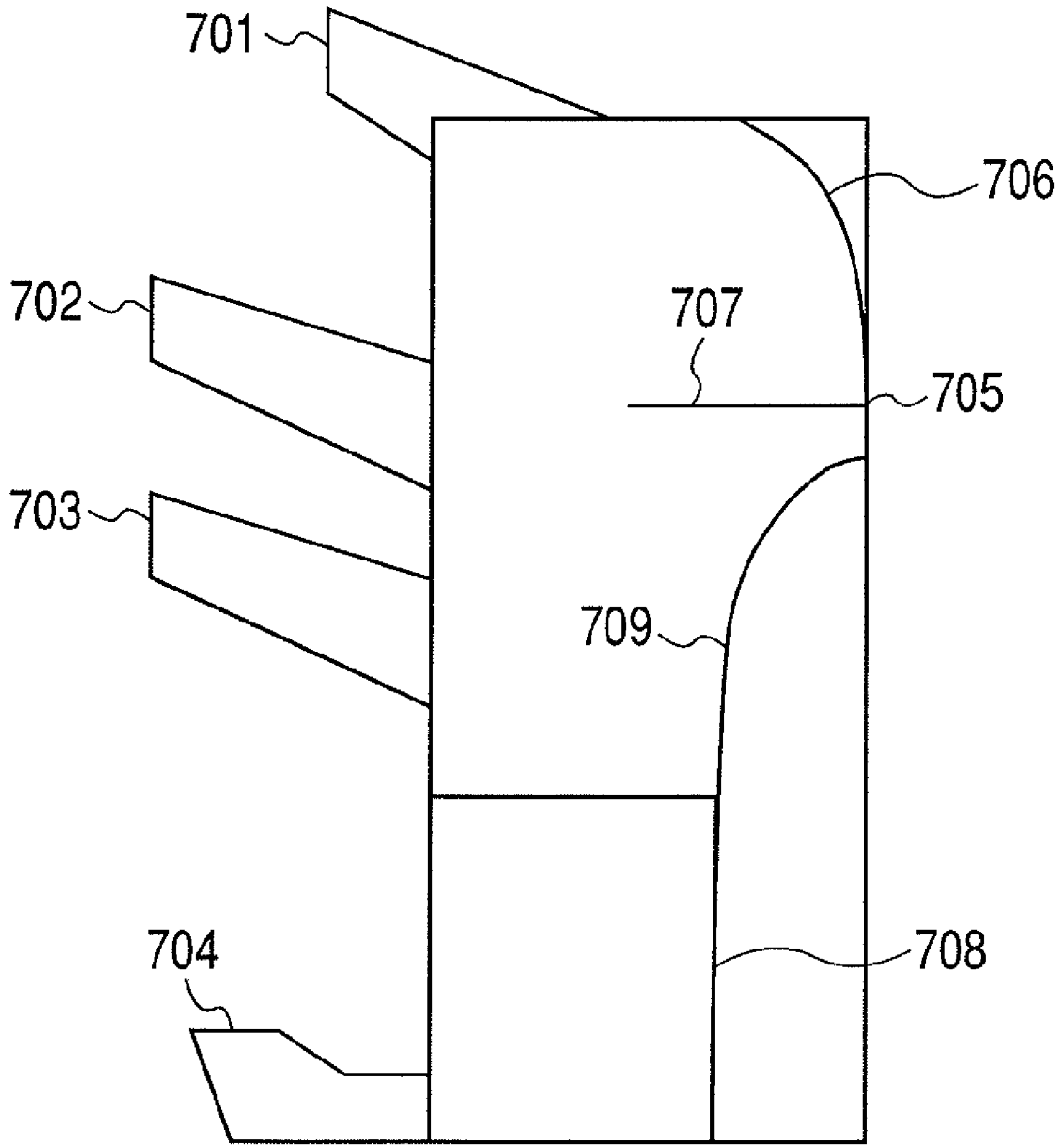
FIG. 7 is a cross sectional view for describing a construction of a finisher unit of the MFP shown in FIG. 3.

FIG. 7 is a cross sectional view for describing a construction of the finisher unit 304 of the MFP shown in FIG. 3.

In FIG. 7, the finisher unit 304 has sheet discharge bins 701, 702, and 703. The sheet conveyed from the printer unit is fed from a sheet feeding port 705. In the case of outputting the sheet to the sheet discharge bin 701, the sheet is guided to a path 706 and ejected onto the sheet discharge bin 701. In the case of outputting the sheet to the sheet discharge bin 702, the sheet is guided to a path 707 and ejected onto the sheet discharge bin 702.

In the case of outputting the sheet to the sheet discharge bin 703, the sheet discharge bins 702 and 703 are moved upward so that a height of path 707 and a height of sheet discharge bin 703 coincide, and thereafter, the sheet is ejected. A sheet discharge bin 704 is a sheet discharge bin only for use of a booklet process. After the sheets were guided from a path 709 to a booklet unit 708 and booklet-processed in the booklet unit 708, the sheets of a book shape are ejected onto the sheet discharge bin 704.

Figure 8:
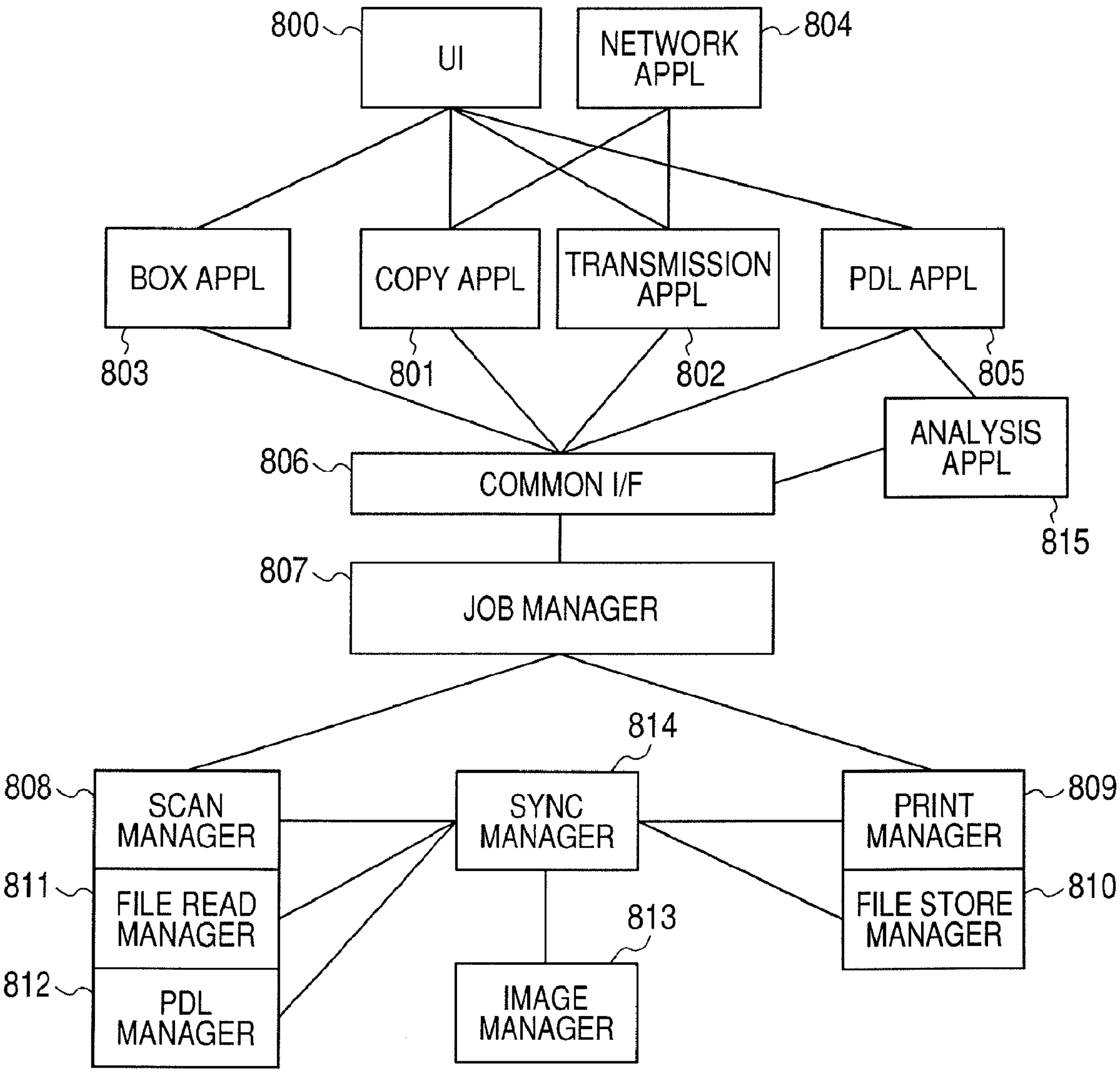
FIG. 8 is a block diagram for describing a construction of a software module of the MFP shown in FIG. 3.

FIG. 8 is a block diagram for describing a construction of a software module of the MFP shown in FIG. 3.

In FIG. 8, a UI control unit 800 controls the display operation unit. A copy application unit 801 receives an instruction from the UI control unit 800 and executes the copying operation.

A transmission application unit 802 receives an instruction from the UI control unit 800 and executes the transmitting operation. A BOX application unit 803 executes the scanning/printing operation from a box display screen.

A PDL application unit 805 receives PDL print data from a network application 804 and inputs a PDL print job.

A common interface (I/F) 806 absorbs an apparatus depending portion of an apparatus control portion. A job manager 807 rearranges job information received from the common I/F 806 and transfers them to a document processing unit of a lower layer.

The document processing unit is illustrated as an example constructed by the following manager portions.

For example, in the case of a local copy, a scan manager 808 and a print manager 809 function as a document processing unit.

In the case of a transmission job, such as a remote copy or a facsimile transmission, the scan manager 808 and a file store manager 810 function as a document processing unit.

In the case of a reception job of the remote copy, a file read manager 811 and the print manager 809 function as a document processing unit. In the case of the PDL print, a PDL manager 812 and the print manager 809 function as a document processing unit. As for the PDL here, it is desirable to use "LIPS", "PostScript", or the like.

An image manager 813 synchronizes the operation timings among the document managers and executes various image processes. The image processes are requested to the image manager 813 through a sync manager 814. Further, the image manager 813 executes the image process upon scanning or printing and storage of an image file. The application unit is abbreviated to an "APPL unit" hereinbelow.

An analysis application 815 analyzes a job file output from the PDLAPPL unit 805, edits it, and inputs a job to the common I/F.

Figure 9:
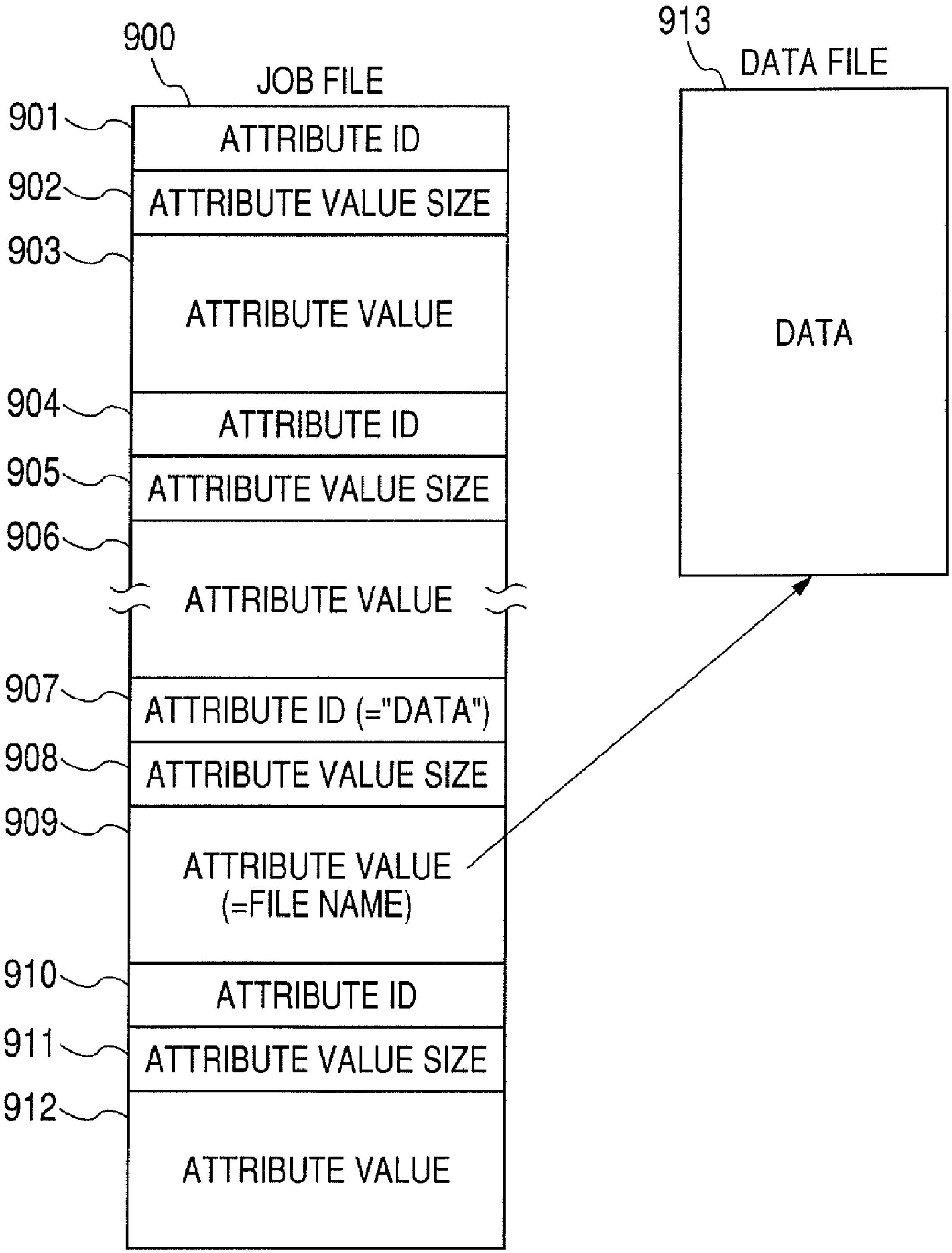
FIG. 9 is a diagram illustrating an internal structure of data serving as a substance of a job which can be processed by the image processing apparatus according to an embodiment.

FIG. 9 is a diagram illustrating an internal structure of data serving as a substance of the job which can be processed by the image processing apparatus according to an embodiment.

In FIG. 9, those job file and data are formed by the APPL units 801, 802, 803, and 805 in the apparatus when a job executing instruction is received from the UI control unit 800 or network application 804 shown in FIG. 8.

For example, in the copy job, the copy APPL unit 801 is notified of the settings input from the display 203. The job is formed from the notified information. In the PDL job, the PDLAPPL unit 805 forms the job based on the information notified from the network APPL unit 804.

The substance of the job is expressed by continuously having a plurality of sets of attribute IDs 901, 904, and 910, attribute value sizes 902, 905, and 911, and attribute values 903, 906, and 912.

If the job includes data, a value showing the data is held as an attribute ID 907, an attribute value size 908 of the file name is held as an attribute value 909, and a file name of a data file 913 which holds document data is held as an attribute value.

A format (PDL or the like which is used) of the data file 913, the number of copies, the cassette stage, the designation of the finishing process, and the like are included in the attribute value 909.

FIG. 10 is a diagram illustrating details of a main section of the internal structure of the data serving as a substance of the job shown in FIG. 9. This diagram illustrates an example of the job information attribute in the internal structure of the data.

In FIG. 10, an attribute ID 1001 indicates an ID number of the attribute. A type ID 1002 indicates a type (size) of ID. The type ID 1002 has been predetermined in a manner such that when the type ID 1002 is equal to "1", the ID size is equal to a variable length, and when the type ID 1002 is equal to "2", the ID size is equal to one byte. When type ID 1002 is equal to "11", a value 1003 is equal to a value within a range from 0 to 7015 or from 0 to 9920.

The value 1003 indicates an available value and has a meaning as shown in a meaning 1004. The values shown in this table are shown as an example. Naturally, various attributes other than those values exist. The job is formed by setting those values to arbitrary ones of the attribute IDs, the attribute size IDs, and the attribute values shown in FIG. 9. In an embodiment, there is shown an example in which the meaning 1004 includes a job name, an application name, a cassette stage, a sheet discharge stage, the number of copies, an image size, a movement amount, a duplex print, a binding position, and the like. As an application name, the name corresponding to a specific application is set.

FIG. 11 is a diagram illustrating an example of a default setting attribute table (hereinbelow, abbreviated to an "attribute table") which can be set by the image processing apparatus according to an embodiment. The application mentioned here denotes an application corresponding to the specific application which is executed by the user on the client side. The default setting attribute table which can be set every application is formed by the CPU 201 and registered into the DISK 211 shown in FIG. 2.

In an embodiment, the specific application denotes, for example, a receipt application, a document forming application, a presentation application, a spreadsheet application, a drawing application, or the like, or may be an application for executing another data process.

In FIG. 11, an attribute ID 1101 denotes an attribute which can be set to "default". In this example, a cassette stage and a sheet discharge stage which are used by the MFP, the number of copies, a movement amount, a duplex print, a binding margin, and a trial print can be set to "default" so as to correspond to a meaning 1104. The targets which can be set are not limited to those mentioned above so long as it can be set as a condition accompanied with the image process of the MFP.

A state 1102 indicates a setting situation of the attribute. There is shown an example in which the state 1102 has the following four states: the setting of "default"; the setting of "dedicated"; the setting of "OFF"; and the setting of "exception". The controller 101 controls so that the four states function as application information stored in the attribute management table.

Therefore, based on the four states, the controller 101 controls a plurality of sheet feeding units as resources so as to output the print job based on the attribute information registered in the attribute table in place of the print attribute designated by the print job.

The attribute which has been set to "default" denotes that if the coincident attribute exists in the attributes of the job shown in FIG. 9, the attribute is replaced with this value.

Since the attribute whose state 1102 has been set to "dedicated" corresponds to the cassette stage in the example illustrated in FIG. 11, this means that the cassette stage can be used only by the application (for example, receipt application) with which the list has been associated. That is, in the example illustrated in FIG. 11, since the state 1102 indicates "dedicated" for ID "100" in the attribute ID 1101 with respect to the cassette stage in the meaning 1104, a value 1103 is forcedly set to "1" irrespective of the value of the application.

In the case where the receipt application has been registered in the attribute table in the DISK 211, even if the application side erroneously designates the cassette C2 as a cassette stage, the controller 101 designates the cassette stage as a cassette C1.

Thus, in the case where the dedicated sheets have been allocated to the receipt application and enclosed in the cassette C1, control to certainly select the sheets in the cassette C1 for the file of the receipt application is executed.

Further, the attribute in which the state 1102 in the attribute table shown in FIG. 11 has been set to "OFF" indicates that the default setting is not made.

In addition, the attribute set to "exception" denotes that when the attribute is set by the application, the default is ignored.

For example, the file formed by the receipt application is "trial printed" in place of the main printing for actually printing the file onto the dedicated sheet allocated to the application. The trial print is valid in such a case (the case where the "dedicated" sheets allocated to the application are not used). Thus, in the control of the cassette stage, even if the cassette C1 has been registered as "dedicated" in the receipt application, the cassette C2 or the like which differs from the cassette C1 and corresponds to the designation of the application side can be selected. The trial print can be performed by using reasonable sheets of plain paper (other than the dedicated sheets) enclosed in the cassette C2.

In the example of the table illustrated in FIG. 11, the attribute of the sheet discharge stage and the attribute of duplex are allocated to the default setting.

Therefore, this means that in the job input from the application associated with the default setting attribute table, "2" is certainly used as attribute values of the attribute of the sheet discharge stage and the attribute of duplex. Even if other attribute values have been set or the attributes themselves are not set, those attribute values are certainly changed to "2".

In the example illustrated in FIG. 11, "dedicated" has been allocated to the attribute of the cassette stage and this means that, in the job input from the application associated with the default setting attribute table, "1" is certainly used as an attribute of the cassette stage. At this time, even if another attribute value has been set into the attribute of the cassette stage or the attribute itself is not set, the attribute value is certainly changed to "1".

The attribute value of the attribute whose state 1102 has been set to "dedicated" means that the cassette cannot be used by the applications other than the application associated with the default setting attribute table.

Consequently, for example, in the case where the state 1102 has been set to "dedicated" for the attribute whose meaning 1104 is set to "cassette stage", the specific application which has been registered in correspondence to it selects the cassette which is specified by the value in the value 1103. It is possible to construct in such a manner that the applications other than the application which has been registered in correspondence to it cannot select the cassette which is specified by the value in the value 1103.

Thus, in the applications which are not associated with the above list, "1" cannot be used for the value 1103 of the attribute of the cassette stage.

A case where the trial printing different from the main printing is executed for the registered specific application will now be considered. At this time, for the attribute in which the state 1102 has been set to "dedicated" and the meaning 1104 has been set to "trial print", "1" is set into the value 1103.

In this case, the settings of the cassette stage and the duplex denote that they are not changed to the default value. That is, the settings on the application side are preferentially used.

The exceptional setting becomes valid in the case where the user wants to print to the plain paper without using the application-dedicated sheet when the trial printing is executed.

FIGS. 12A to 12D are diagrams illustrating an example of an operation display screen for describing the default setting method of each application which is executed by the operation unit 106 shown in FIG. 1.

Figure 12A:
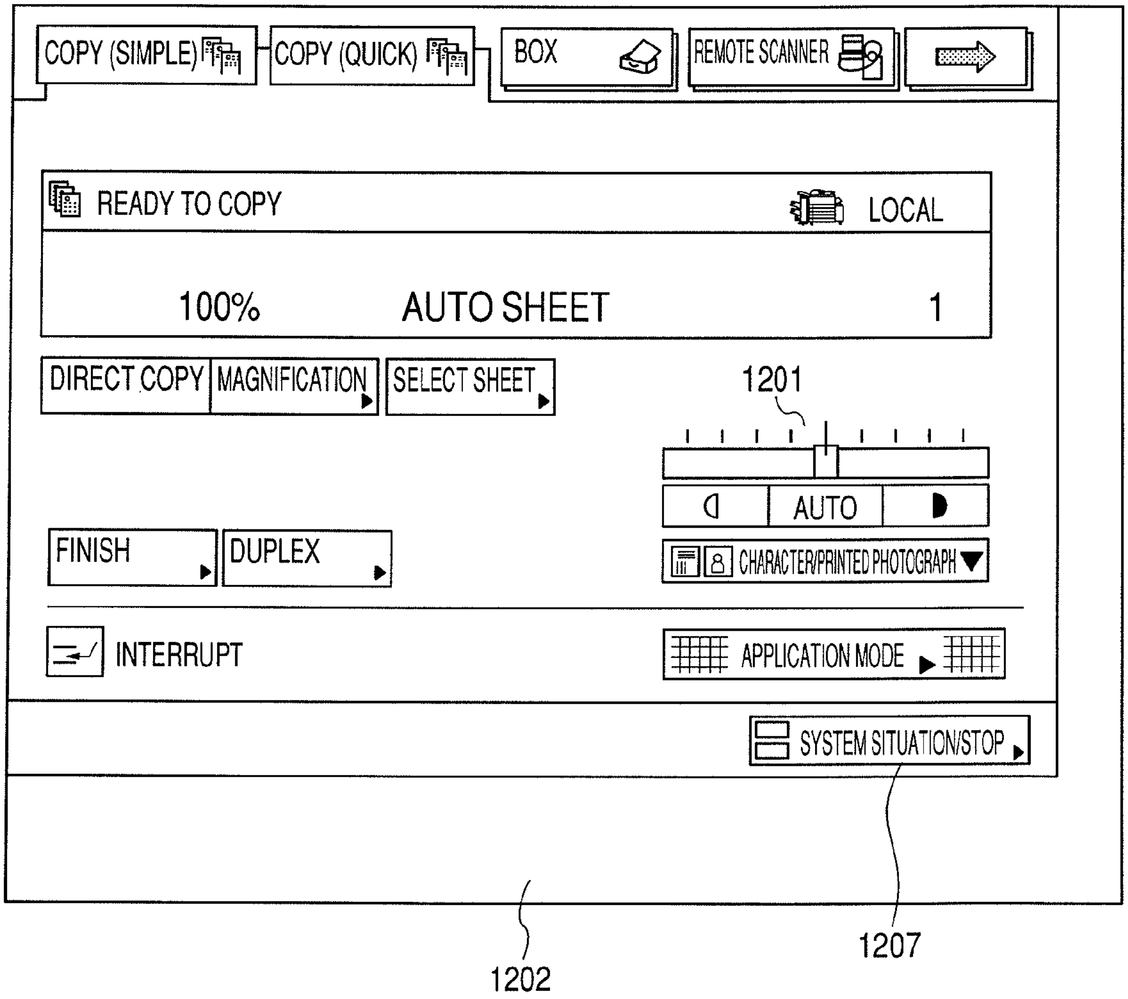
FIG. 12A is a diagram illustrating an example of an operation display screen for describing a default setting method of each application which is executed by the operation unit shown in FIG. 1.

Ordinarily, in the standby mode, a standard display screen illustrated in FIG. 12A is displayed by the LCD unit 401 of the operation unit 106.

The standard display screen includes an operation display screen area 1201 and a free area 1202. Information to confirm the operation setting such as a copy or the like and the state is displayed in the operation display screen area 1201.

Other information can be displayed in the free area 1202.

Figure 12B:
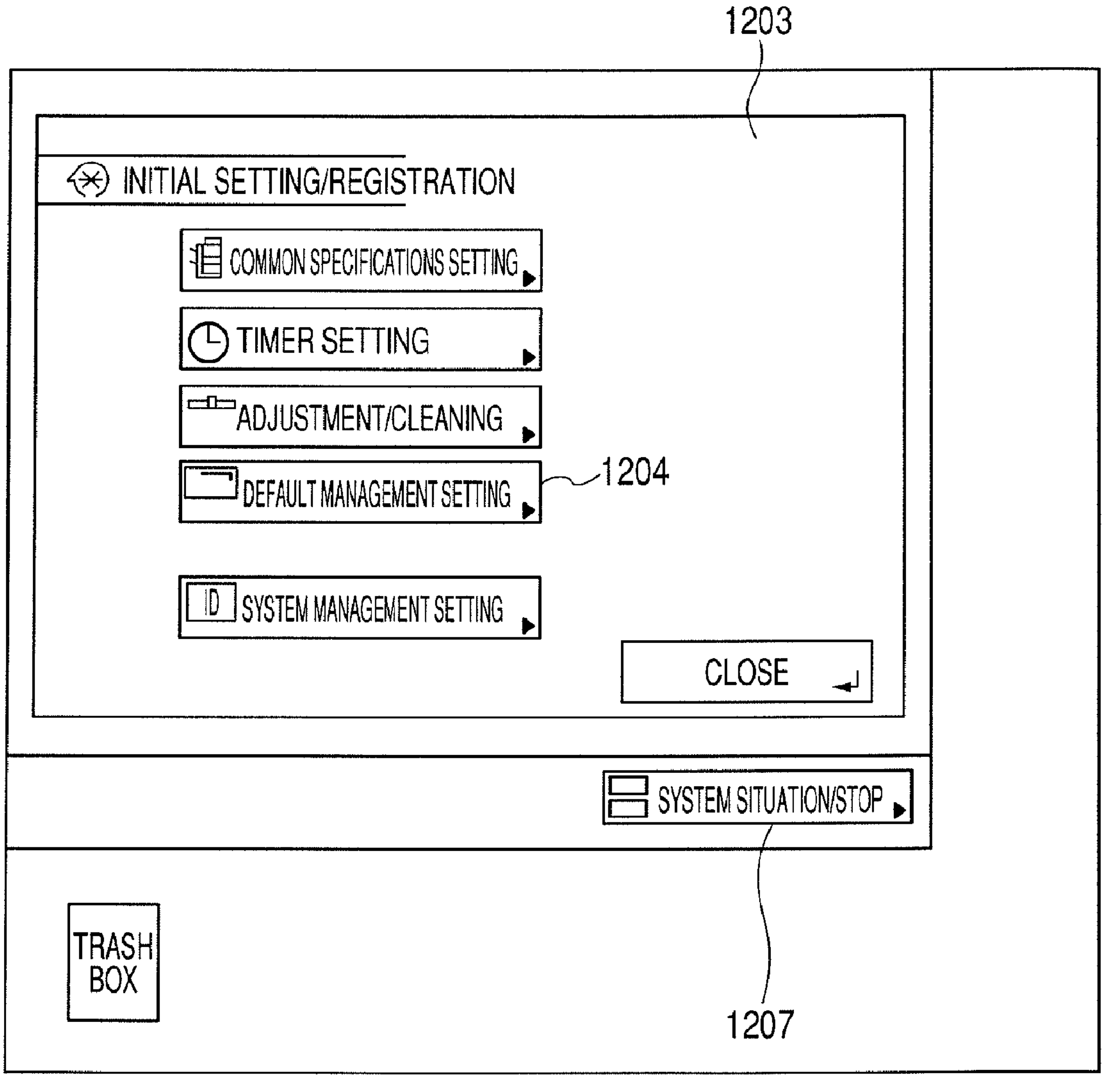
FIG. 12B is a diagram illustrating an example of the operation display screen for describing the default setting method of each application which is executed by the operation unit shown in FIG. 1.

When a user setting button included in a button group of the ten-key 405 is pressed, the display screen displayed on the LCD unit 401 of the operation unit 106 is switched to the display screen illustrated in FIG. 12B.

In FIG. 12B, a setting registration display screen 1203 displays buttons for making various settings. When a default management setting button 1204 is pressed, the display screen displayed on the LCD unit 401 of the operation unit 106 is switched to the display screen illustrated in FIG. 12C.

Figure 12C:
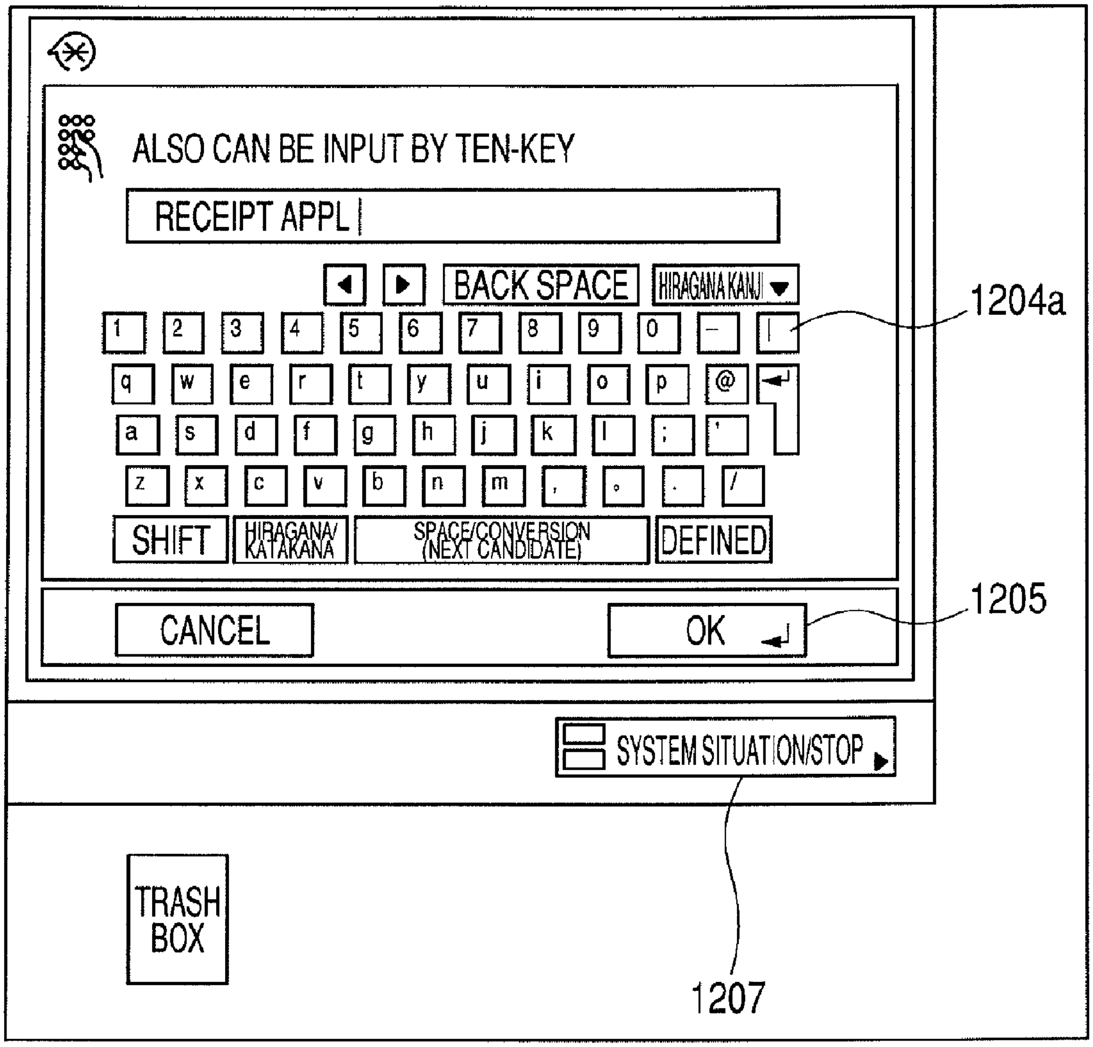
FIG. 12C is a diagram illustrating an example of the operation display screen for describing the default setting method of each application which is executed by the operation unit shown in FIG. 1.

In FIG. 12C, since a keyboard display screen 1204*a* is displayed, the name of the application is registered on this keyboard display screen 1204*a*. In this example, the application name "receipt application" is registered. Since a Kanji (Chinese character) conversion processing application has been stored in the controller 101 of the MFP, by inputting character data onto the keyboard display screen 1204*a*, a Kanji-converted character string is displayed.

When the registration of the application name or the like is finished here, an OK button 1205 is pressed. When the OK button 1205 is pressed, the display screen displayed on the LCD unit 401 of the operation unit 106 is switched to the display screen illustrated in FIG. 12D.

Figures 12D, 13:
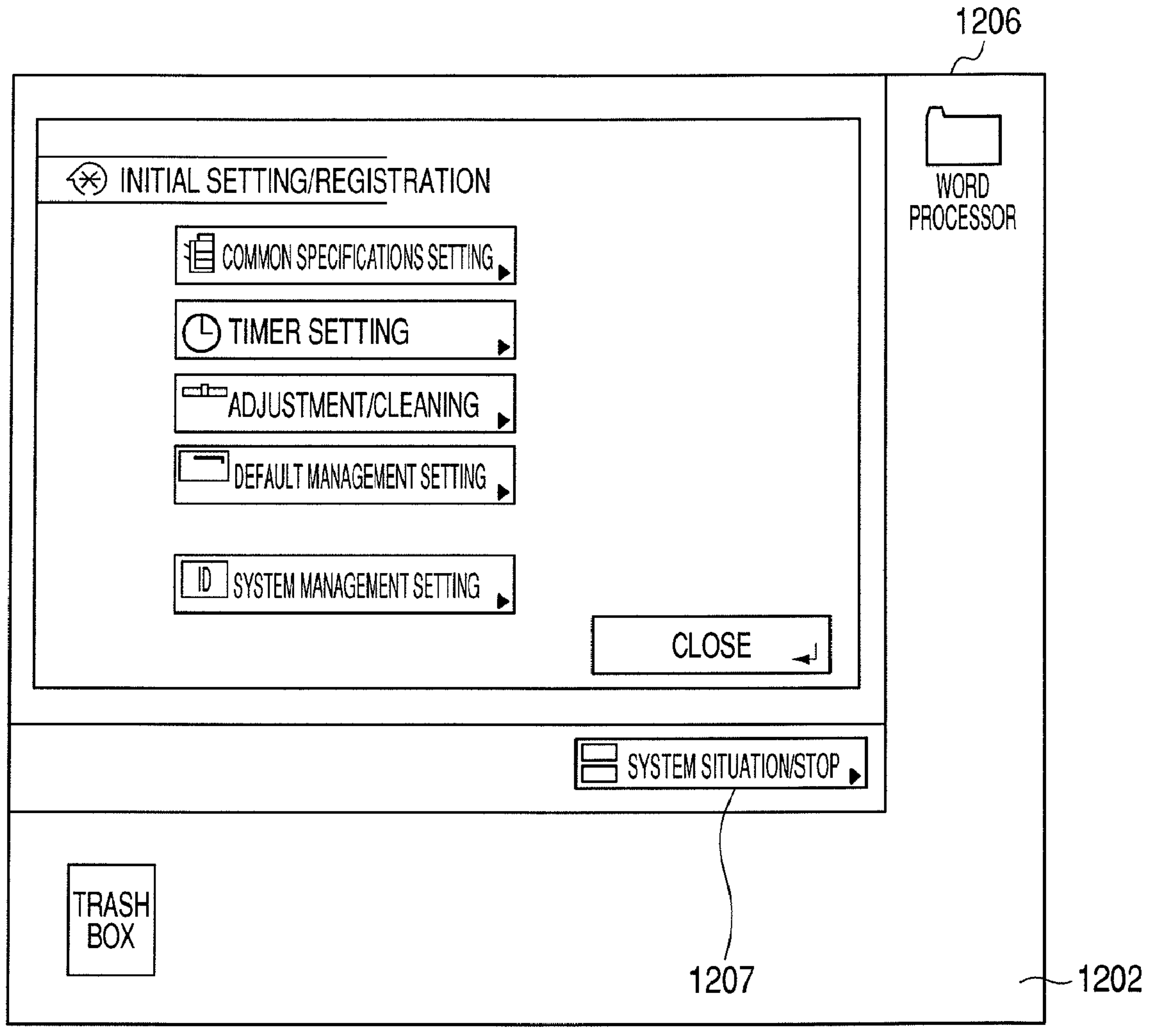
FIG. 12D is a diagram illustrating an example of the operation display screen for describing the default setting method of each application which is executed by the operation unit shown in FIG. 1.
FIG. 13 is a diagram illustrating a file name list which is formed by an application registering process shown in FIGS. 12A to 12D.

In FIG. 12D, the display screen is displayed and a folder 1206 is displayed in the free area 1202. At this time, an attribute table in which all items of the state 1102 shown in FIG. 11 are set to "OFF" and values 1103 are not set is formed in the DISK 211. That is, the default setting attribute table in an initial setting state where the settings of the user are not reflected is formed.

By repeating the above operation, a plurality of folders are displayed in the free area 1202. The default setting attribute table corresponding to each folder is formed in the DISK 211.

FIG. 13 is a diagram illustrating a file name list which is formed by the application registering process shown in FIGS. 12A to 12D.

The table formed as mentioned above is managed by file names as shown in FIG. 13. By extracting the file of the corresponding file name from the DISK 211, what kind of default attributes have been set can be confirmed.

FIGS. 14A to 14G are diagrams illustrating an example of an attribute value setting display screen for the default setting attribute table shown in FIGS. 12A to 12D. The user sets values into the default setting attribute table formed as mentioned above through the display screens illustrated in FIGS. 14A to 14G.

Figure 14A:
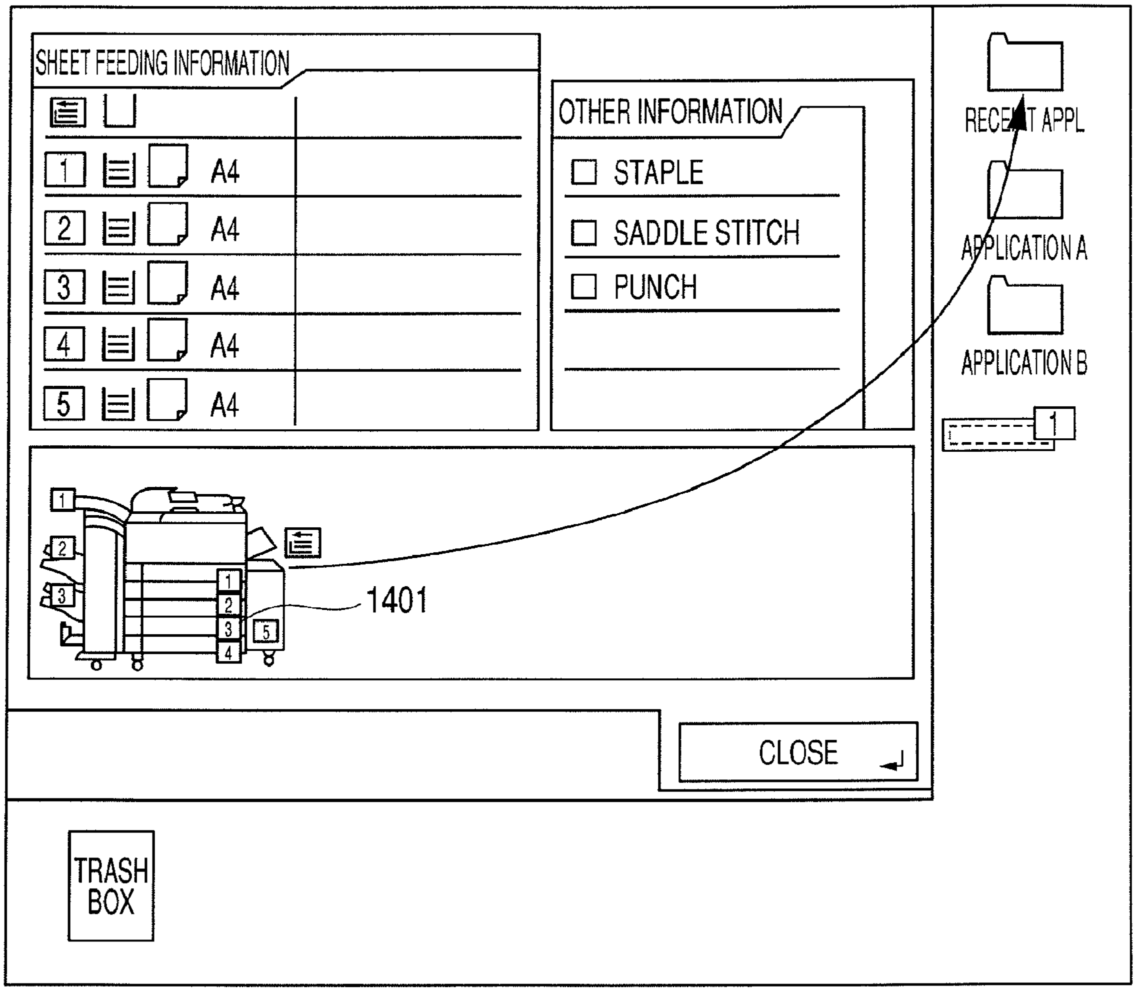
FIG. 14A is a diagram illustrating an example of an attribute value setting display screen for a default setting attribute table shown in FIGS. 12A to 12D.

For example, in the receipt application, when the user wants to certainly use the cassette C1 illustrated in FIG. 3, by pressing a system situation button 1207, the standard display screen displayed in FIG. 12A is switched to the attribute setting display screen illustrated in FIG. 14A. The sheet feeding units and sheet discharging units equipped for the MFP are displayed as icons corresponding to the resources onto the MFP. Each icon is internally controlled in the controller 101 so that it can be dragged.

In FIG. 14A, the cassette which is allocated to the specific application is determined from a cassette number 1401. The icon corresponding to the displayed cassette is dragged and dropped to any of the formed folder icons of the receipt application and the applications A and B. Thus, the specific application and the cassettes C1 to C4 are registered in correspondence to each other.

The attributes which can be dragged is not limited to the cassettes but may be sheet discharge bins as illustrated in FIG. 14A. That is, the icons of the cassette and the sheet discharge bin can be dragged and dropped to the folder.

Particularly, in the example, FIG. 14A illustrates a state where the cassette icon (No. 1) is dragged and dropped to the folder icon of the receipt application.

By executing the above operation, the controller 101 sets the value in a column of an information attribute ID 100 showing the cassette in the default setting attribute table corresponding to the receipt application managed in the DISK 211 as follows. That is, the value in the column of the information attribute ID 100 showing the cassette in the default setting attribute table is changed to "1" corresponding to the physical cassette C1 equipped for the MFP and stored into the DISK 211.

Figure 14B:
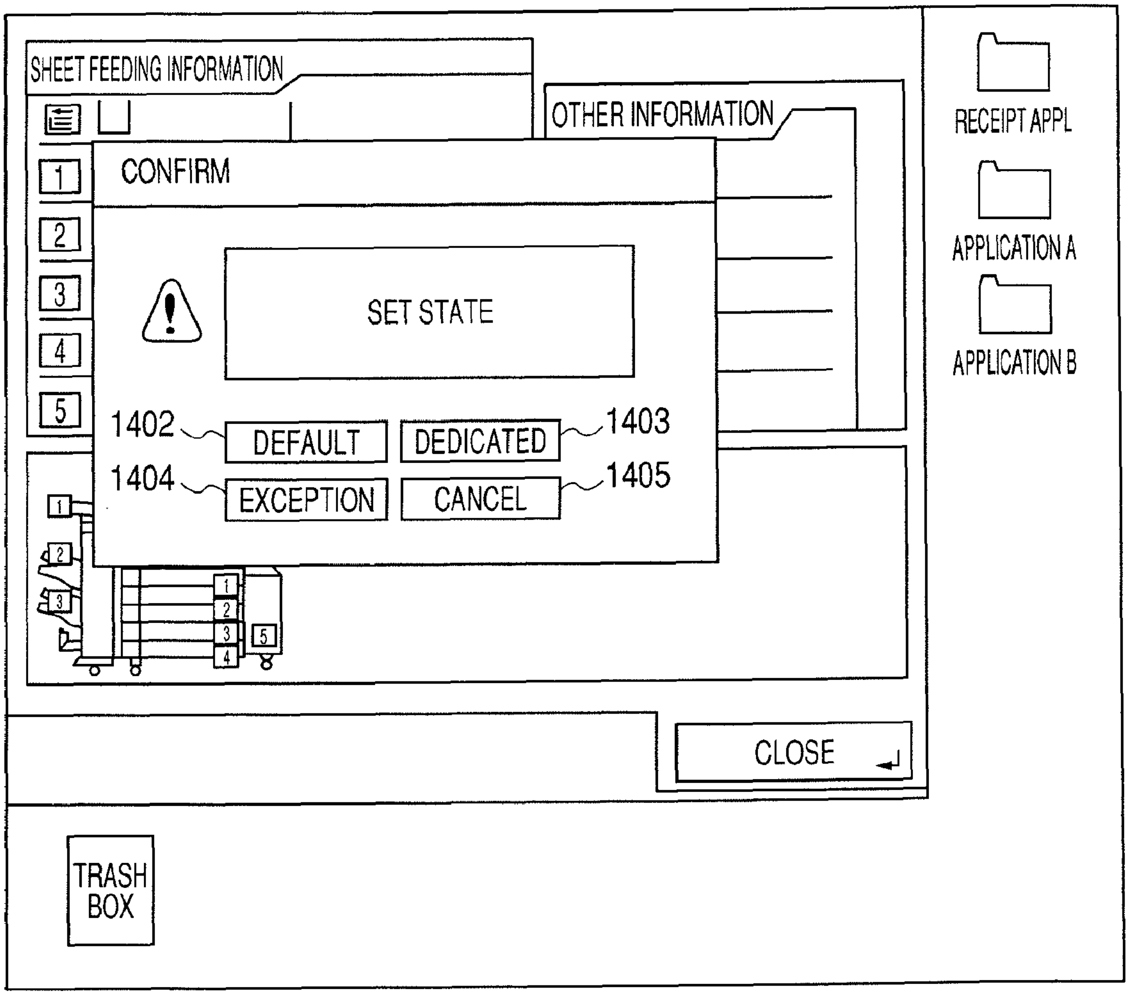
FIG. 14B is a diagram illustrating an example of the attribute value setting display screen for the default setting attribute table shown in FIGS. 12A to 12D.

A display screen for setting whether the attribute which has been dragged at this time is set to "default", "dedicated", or "exception" of the application corresponding to the folder is displayed as illustrated in FIG. 14B.

In the case of setting the attribute to "default", the user presses a default button 1402. In the case of "dedicated", the user presses a dedicate button 1403. In the case of "exception", the user presses an exception button 1404. In the case where the user does not make the setting, the user presses a cancel button 1405.

When one of those buttons is pressed, the controller 101 changes the item of the state in the default setting attribute table shown in FIG. 11 and writes into the DISK 211.

Figure 14C:
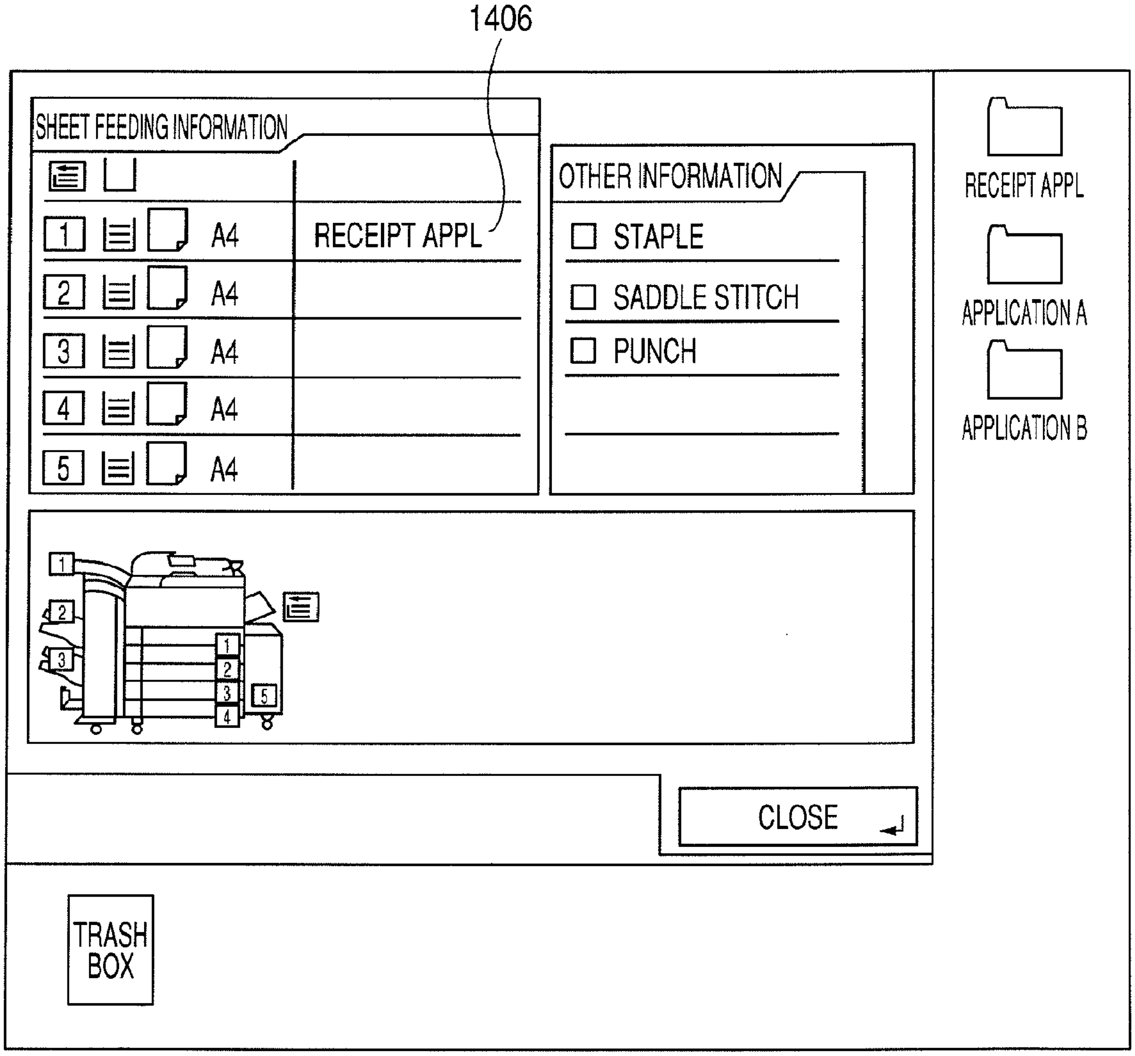
FIG. 14C is a diagram illustrating an example of the attribute value setting display screen for the default setting attribute table shown in FIGS. 12A to 12D.
Figure 14D:
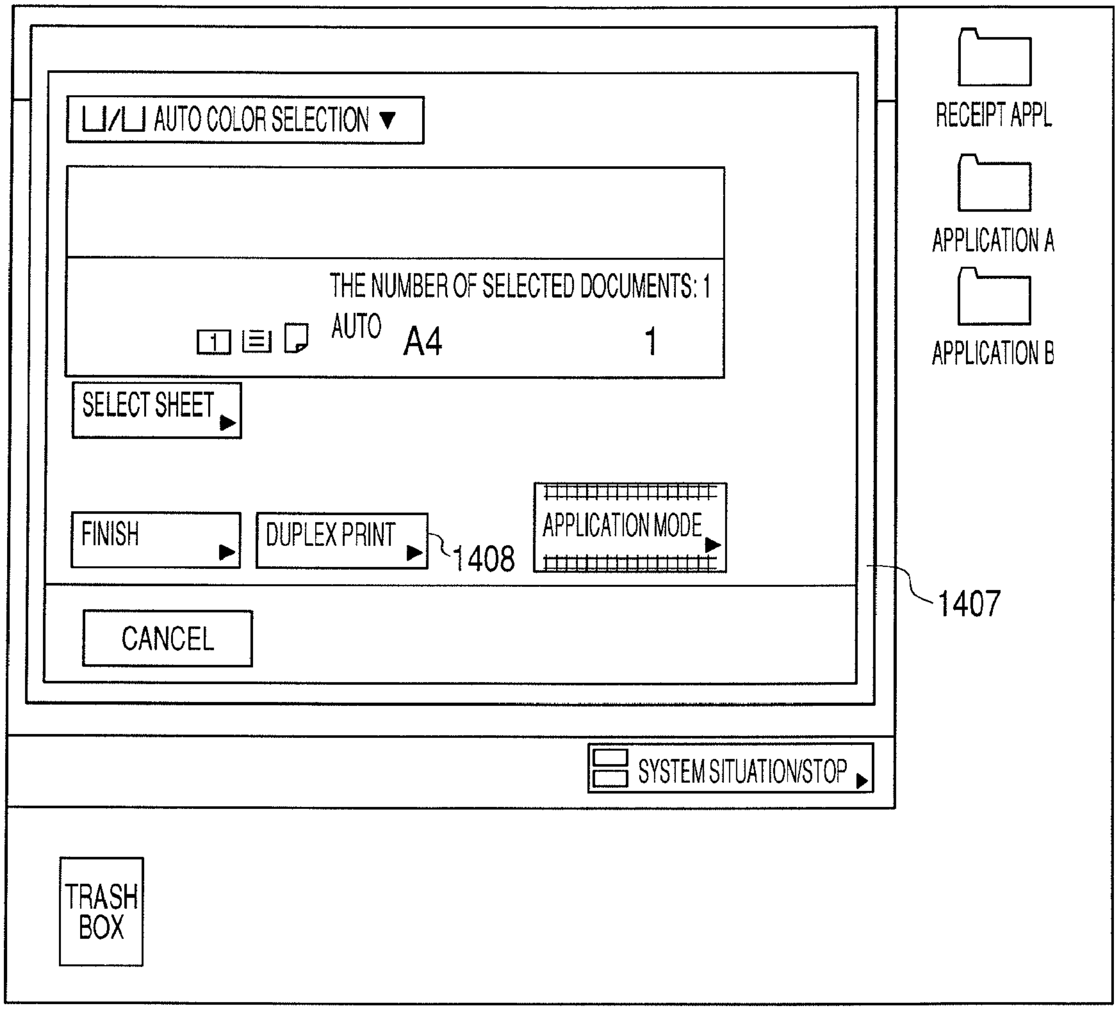
FIG. 14D is a diagram illustrating an example of the attribute value setting display screen for the default setting attribute table shown in FIGS. 12A to 12D.
Figure 14E:
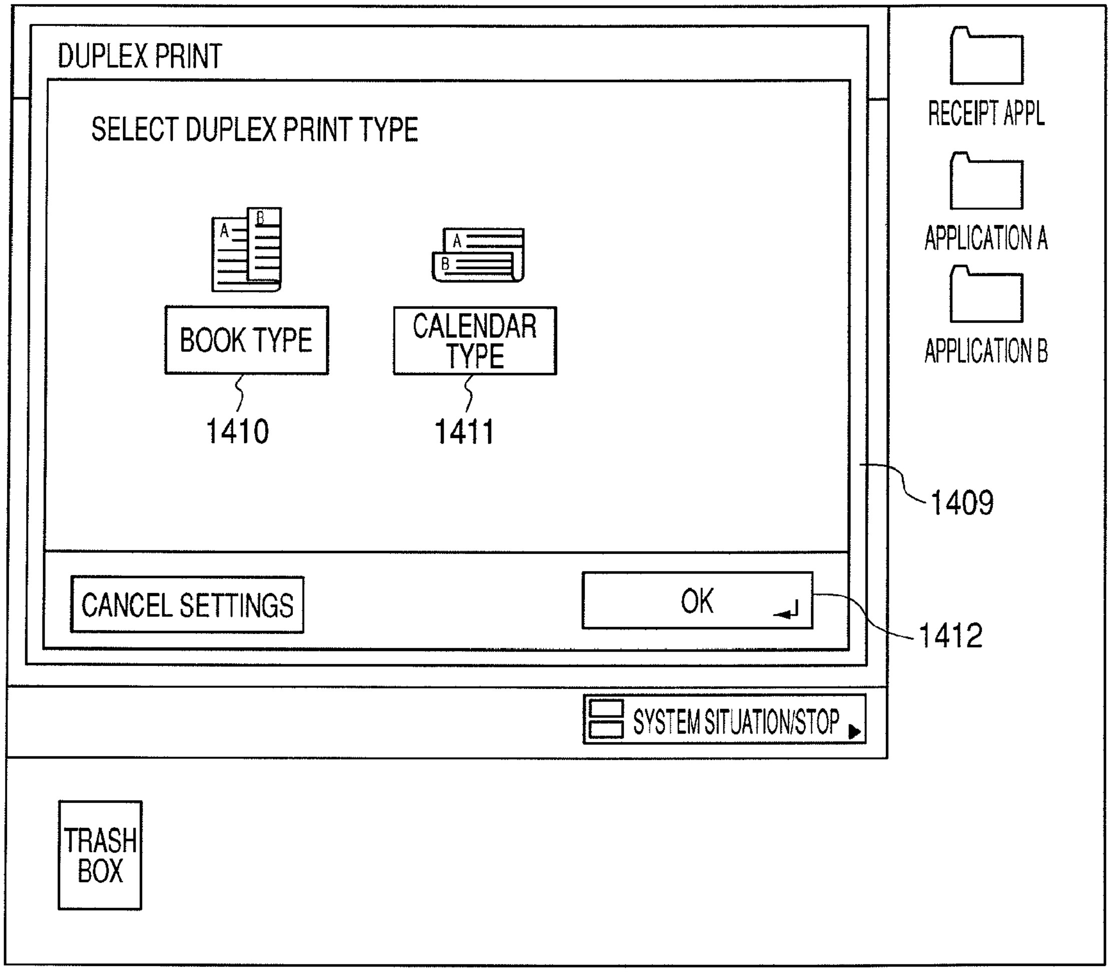
FIG. 14E is a diagram illustrating an example of the attribute value setting display screen for the default setting attribute table shown in FIGS. 12A to 12D.
Figure 14F:
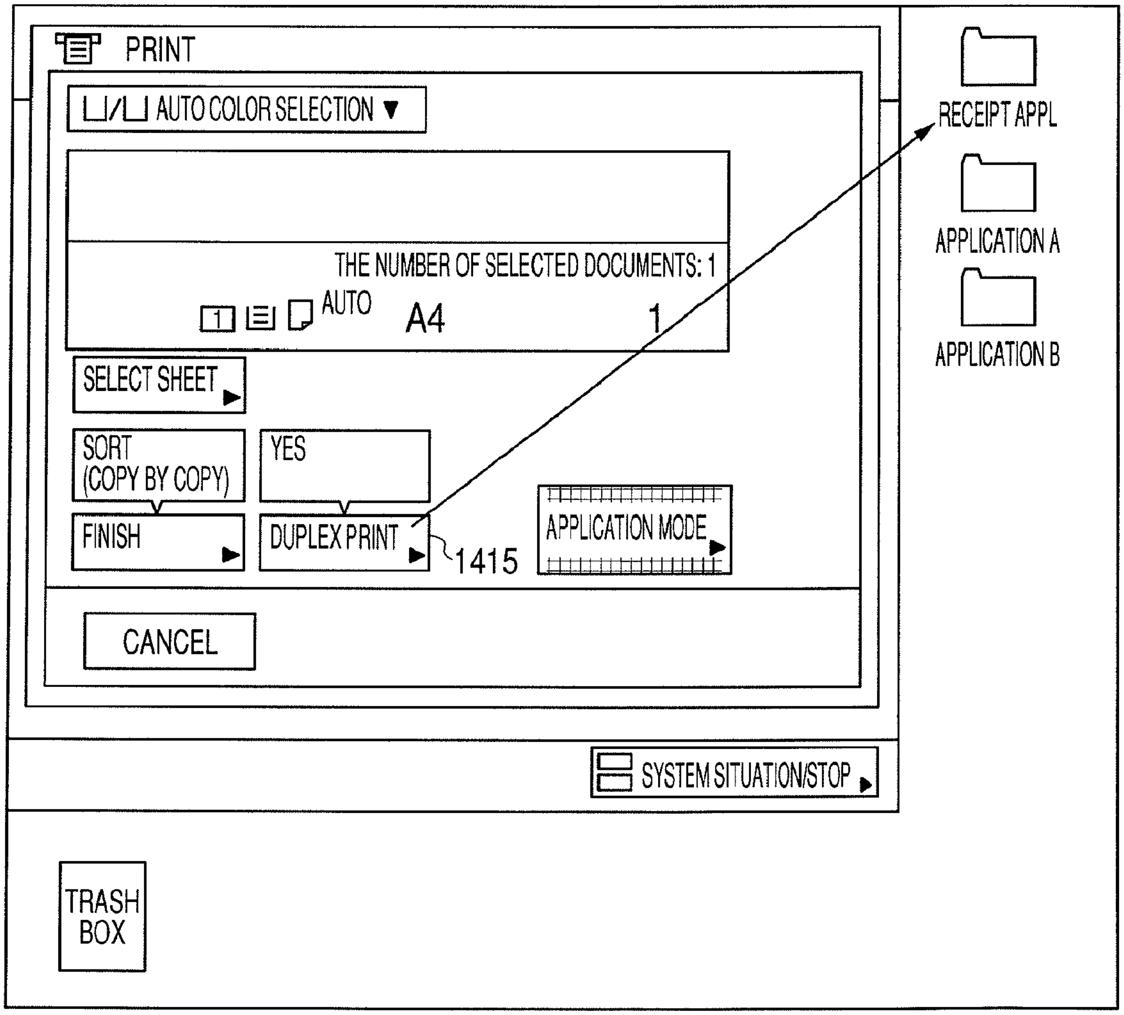
FIG. 14F is a diagram illustrating an example of the attribute value setting display screen for the default setting attribute table shown in FIGS. 12A to 12D.
Figures 14G, 15:
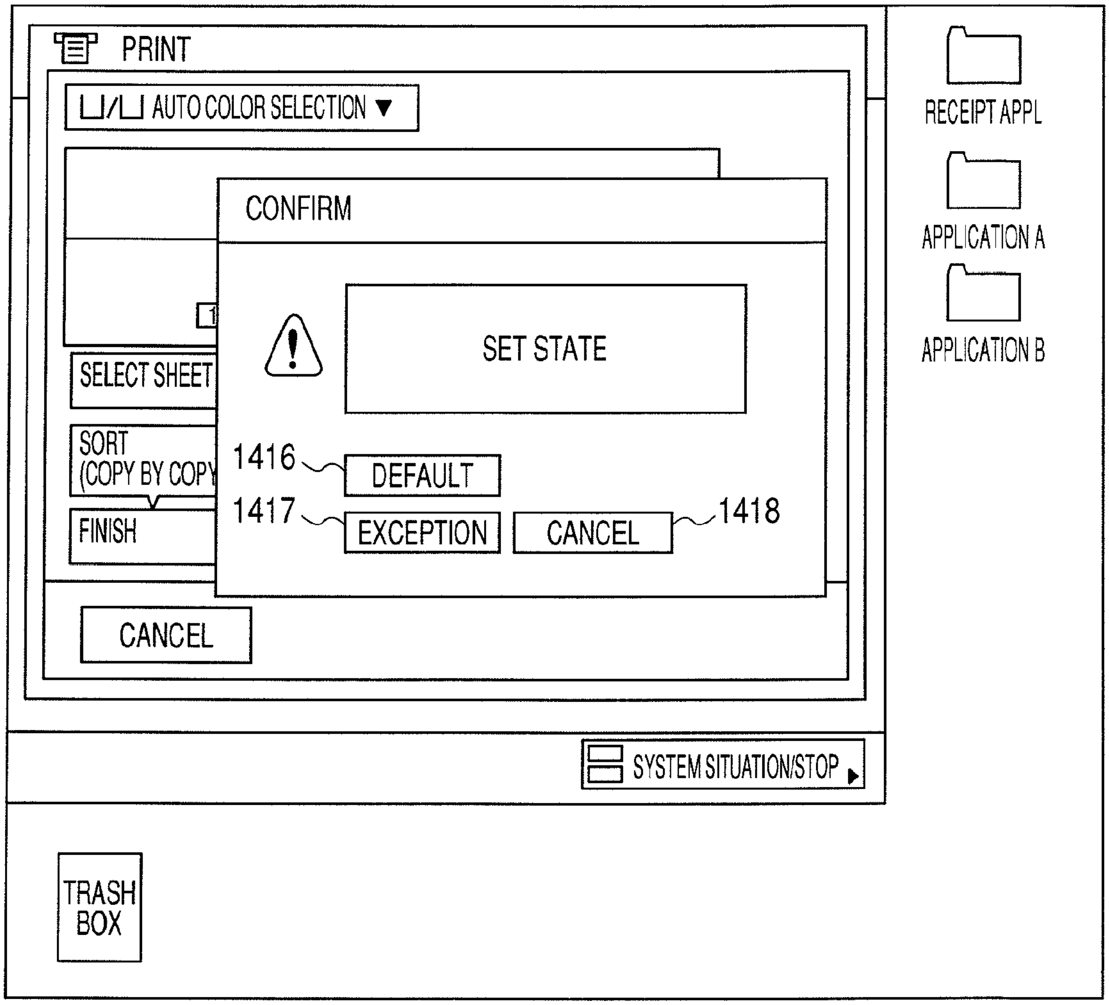
FIG. 14G is a diagram illustrating an example of the attribute value setting display screen for the default setting attribute table shown in FIGS. 12A to 12D.
FIG. 15 is a diagram illustrating an example of a device management table (DMT) which is stored into a storing medium DISK shown in FIG. 2.

In this instance, the controller 101 updates a device management table shown in FIG. 15 and writes data showing the application for which the portion such as a cassette or a bin has been set as a dedicated portion.

FIG. 15 is a diagram illustrating an example of the device management table (DMT) which is stored into a storing medium DISK 211 shown in FIG. 2. This diagram shows an example in which a relation between the sheet feeding resource equipped for the MFP, the sheet discharging resource, and the allocated dedicated application is stored. An embodiment is constructed in such a manner that, for example, the specific application can correspond to the sheet feeding resource and the sheet discharging resource as resources of the MFP. The resources which can correspond to the specific application are not limited to them.

The device management table (DMT) includes columns 1501, 1502, 1503, 1504 and 1506. Column 1501 shows cassettes or bins and column 1503 shows corresponding dedicated applications. With respect to columns 1502, 1504 and 1506, descriptions will be given later.

FIG. 15 shows an example in which the cassette C1 is the dedicated part for the receipt application in this table. That is, this table is also stored in the DISK 211 which is controlled by the controller 101 and it is updated every time the similar setting is made.

The portions allocated as dedicated parts in this table cannot be used by another job or application.

After such a setting is finished, the display screen is switched to the display screen as illustrated in FIG. 14C.

FIG. 14C shows a state 1406 where the name of the application allocated as a dedicated part is shown.

The processes in the case of registering the duplex setting will now be described with reference to the operation display screen.

When a mode setting button (not shown) is pressed, the display screen is switched to the display screen as illustrated in FIG. 14D.

FIG. 14D illustrates a mode setting display screen 1407. When a duplex print button 1408 is pressed in order to set the duplex print, the display screen is switched to the display screen as illustrated in FIG. 14E.

FIG. 14E illustrates a duplex print type setting display screen 1409. After one of a book-type button 1410 and a calendar-type button 1411 was pressed and the duplex print was set, an OK button 1412 is pressed. When the OK button 1412 is pressed, the display screen is switched to the display screen as illustrated in FIG. 14F.

FIG. 14F illustrates a registration display screen for making a printing function correspond to the registered application and shows a state where a duplex button 1415 has been set.

When the duplex button 1415 is dragged and dropped to an arbitrary folder, the controller 101 changes an attribute value of a duplex attribute in the device management table which is managed in the DISK 211.

When the duplex button 1415 is dropped, the display screen is switched to the attribute confirming display screen as illustrated in FIG. 14G.

On the attribute confirming display screen illustrated in FIG. 14G, when the user allows the application to correspond to the printing function, a state of the attribute is set.

In the example, the state which can be set differs depending to the attribute and the default and the exception can be set in this display screen.

The controller 101 sets one of a default button 1416, an exception button 1417, and a cancel button 1418, so that the device management table is updated and written into the DISK 211.

If the user wants to cancel the contents set in the DISK 211, by dragging and dropping the corresponding folder into a trash box, the corresponding contents in the device management table are deleted from the DISK 211. If the attribute whose state has been set to "dedicated" exists in the device management table, the controller 101 changes the attribute whose dedicated flag shown in FIG. 15 is ON to OFF and stores into the DISK 211.

Figure 16:
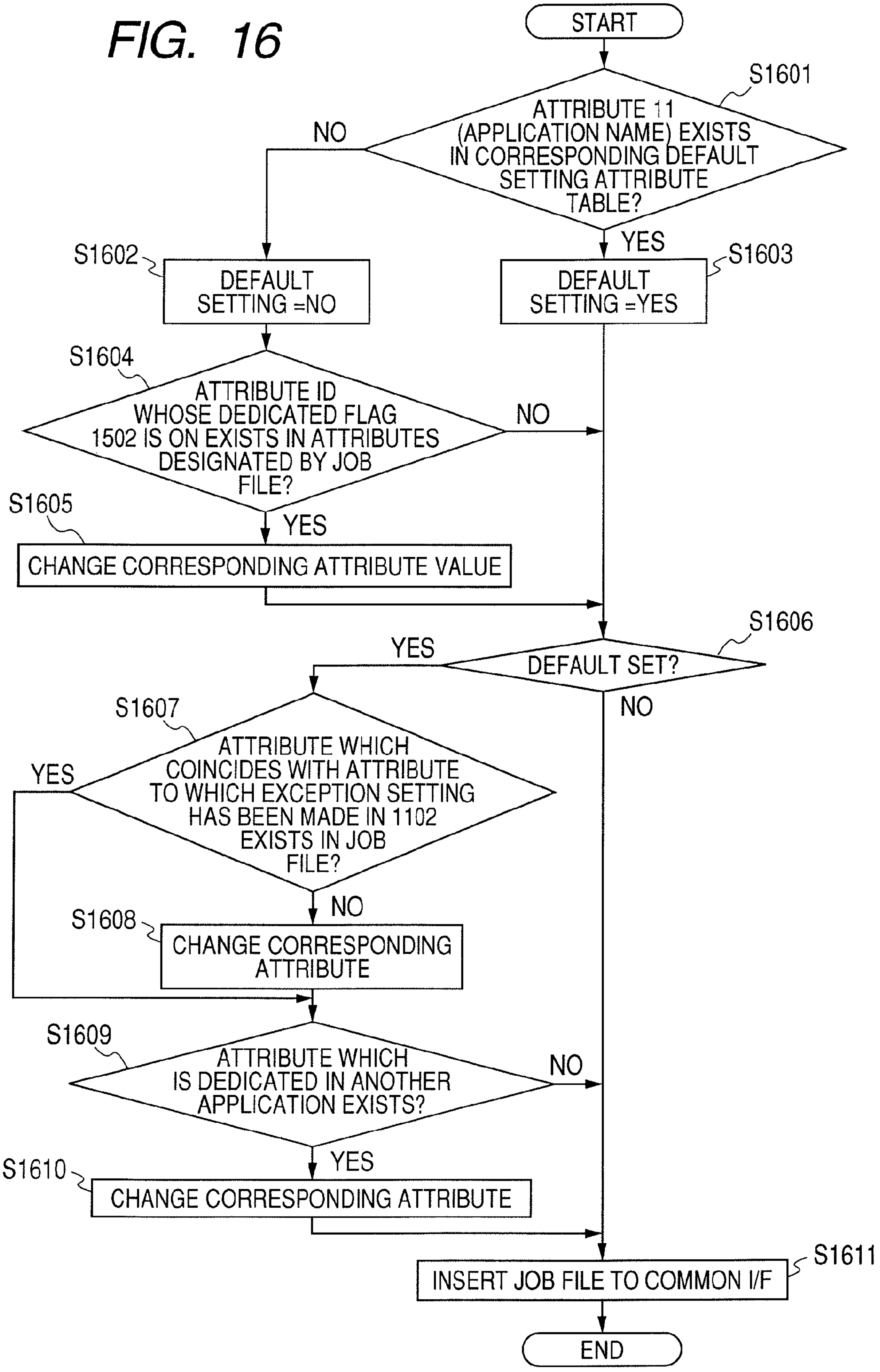
FIG. 16 is a flowchart showing an example of a data processing procedure which is executed in the image processing apparatus according to an embodiment.

FIG. 16 is a flowchart showing an example of a data processing procedure which is executed in the image processing apparatus according to an embodiment. This processing procedure relates to a processing example in which when the job from the specific application according to the analysis application 815 is input, the attribute value is changed with reference to the default setting attribute table. S1601 to S1612 indicate processing steps. The processing steps are realized by a method whereby the controller 101 reads out the control program from the DISK 211 or the like, loads the control program into the memory 202, and executes it.

The file and data are transmitted from the host computer through the network by a protocol corresponding to the network and received by a network application unit of the MFP.

After the network application unit received the information of the data, file, or the like, the information received to the application in the apparatus is shaped into the proper form of the job file shown in FIG. 9 by the application unit 801, 802, 803, or 805. The network application unit executes the job by inputting the job file into the common I/F unit 806.

When "default" has been set, before the job is input to the common I/F unit from the PDL application, the data is transferred to the analysis application 815. After that, the data is transferred to the common I/F unit 806.

First, in S1601, the job file which has been input to the analysis application 815 is analyzed. The controller 101 discriminates whether or not the file name having the same name as the character string of the value 1003 in which the attribute ID 1001 on the substance of the job shown in FIG. 10 is equal to "11" exists in the table shown in FIG. 13. If it is determined that the file name having the same name as the character string of the value 1003 in which the attribute ID 1001 is equal to "11" does not exist in the attribute table, it is decided in S1602 that there are no default settings. The application which has already been registered in the DISK 211 of the MFP and the application which is not registered yet are identified. The subsequent attribute setting processes are switched.

In S1604, the controller 101 discriminates whether or not the attribute in which a dedicated flag 1502 in the device management table (DMT) illustrated in FIG. 15 is ON exists in the job file. If it is determined in S1604 that the attribute whose dedicated flag 1502 is ON does not exist, S1606 follows. Whether or not the attributes for the specific application and the resource of the MFP have been set is discriminated in S1606.

If it is determined in S1604 that the attribute whose dedicated flag 1502 is ON exists, in S1605, an attribute value is changed to a value which does not coincide with the attribute value of the attribute designated to be ON by the dedicated flag 1502 shown in FIG. 15.

Thus, in the example of FIG. 15, according to the job from the application in which "default" is not set, an attribute value 1506 in which an attribute ID 1504 is equal to "101" is changed to a value other than "1". The attribute value 1506 in which the attribute ID 1504 is equal to "102" is changed to a value other than "3". That is, the application other than the receipt application and an application B is set to a value different from the attribute value registered in the device management table as mentioned above.

If it is determined in S1601 that the file name having the same name as the character string of the value 1003 in which the attribute ID 1001 shown in FIG. 10 is equal to "11" exists in the default setting attribute table shown in FIG. 11, "default setting=YES" is set in S1603. The processing routine advances to S1606.

In S1606, the controller 101 discriminates the presence or absence (YES/NO) of the default setting. If the absence of the default setting (=NO) is determined in S1606, the processing routine advances to S1611.

In S1606, if the controller 101 determines the presence of the default setting (=YES), whether or not the attribute which coincides with the attribute that has been set to "exception" in the state 1102 in the attribute table shown in FIG. 11 exists in the job file is discriminated in S1607.

The above discriminating process is executed in order to cope with a case where there is a request to intentionally cancel the attribute of the registered specific application. Such a discrimination is made to allow the user to select the cassette C2 or the like other than the cassette C1 registered by the receipt application.

If it is determined in S1607 that the attribute which coincides with the attribute that has been set to "exception" exists in the job file, S1609 follows.

If it is determined in S1607 that there are no coincident attributes, the corresponding attribute is changed in S1608. In S1609, whether or not the attribute which coincides with the attribute that has been set to "default" or "dedicated" in the default setting attribute table exists in the job file is discriminated in S1608. If it is determined in S1608 that there are no attributes which coincide with the attribute that has been set to "default" or "dedicated", S1611 follows.

If it is determined in S1609 that the attributes which coincide with the attribute that has been set to "default" or "dedicated", in S1610, the controller 101 changes the attribute value of the formed job to the attribute value set in the default setting attribute table shown in FIG. 11. If no attributes exist in the job file, the setting of the attribute is added. Thus, even if the attribute value of the job indicates the attribute value different from the attribute value registered in the DISK 211 of the MFP in correspondence to the specific application, the different attribute value is rewritten to the attribute value which coincides with the attribute table. By using such a construction as mentioned above, the dedicated sheets are fed out of the cassette C1 allocated to the receipt application by the user. The job file is input to the common I/F 806 in S1611. Then, the present processing routine is finished.

As mentioned above, the image processing apparatus shown in the embodiment has the following characteristic functions.

The MFP illustrated in FIG. 1 serving as an image processing apparatus shown in the embodiment executes the image processes by using one of the resources selected from a plurality of resources. "Resources" mentioned here correspond to the sheet feeding unit having a plurality of sheet feeding units (cassettes C1 to C4) or a plurality of sheet discharging units.

In this case, the applications as forming modules for forming print jobs from the application file for executing the specific functional process as shown in FIG. 8 are stored and the controller 101 executes those applications. Thus, the print job corresponding to the input application is formed.

The DISK 211 stores the attribute tables (tables shown in FIGS. 11 and 15) for storing the attribute information to specify the resources to be selected from the plurality of resources which are used every application which can be installed.

The controller 101 has a discriminating function shown in FIG. 16 for discriminating whether or not the applications specified from the print job have been registered in the attribute tables.

If it is determined that the applications have been registered in the attribute tables, the controller 101 controls the selection of the resources so as to output the print job based on the attribute information registered in the attribute tables in place of the print attributes designated by the print job.

If it is determined that the applications are not registered in the attribute tables, the print attributes designated by the print job are compared with the registered attribute information. The controller 101 changes the print attributes which coincide with the attribute information and controls the selection of one of the cassettes so as to output the print job.

Based on the application information as shown in FIG. 11 stored in the attribute management table, the controller 101 determines whether or not one of the cassettes should be selected so as to output the print job based on the attribute information registered in the attribute tables in place of the print attributes designated by the print job.

As mentioned above, the default settings of each application can be registered and the different default setting can be made every application to which the job has been input.

Further, by enabling the dedicated setting of each application to be made, for example, it is possible to set in such a manner that the cassette C1 for which the sheets only for use of the receipts have been set cannot be used by applications other than the application only for use of the receipts. Consequently, such a mistake that the print output from the different application is erroneously printed to the dedicated sheets for the receipts can be eliminated.

According to the embodiment, the print attributes of the print job which is formed from the application are changed according to the attribute information set for the registered application irrespective of the driver setting on the client side. Thus, a burden for changing the driver setting in the related art becomes unnecessary and a burden of the network administrator is also reduced.

Even if the environment of the cassette is changed, it is possible to cope with it by changing the attribute information in the MFP. Therefore, the print job process adapted to the system environment can be realized.

Since the print attributes which are registered into the application can be registered or deleted by the simple operation, the print job environment adapted to the application can be freely constructed.

Second Embodiment

The above first embodiment has been described with respect to the case where the controller 101 makes the print control based on a control procedure shown in FIG. 16 by using the resources registered in correspondence to the specific application. In this case, the controller 101 can register the print mode (into the attribute table) which can be set into the attribute information for specifying the cassette to be selected from a plurality of cassettes which are used every application which can be installed.

When using, for example, the receipt application as a specific application, there is a case where the user wants to use stamp information such as date, company name, serial number, and the like as items to be printed.

Upon registration of the specific applications shown in FIGS. 12A to 12D, application stamp information which can be selected by the MFP is registered in a manner similar to the registering method shown in FIGS. 12A to 12D. Control can be also made in such a manner that when the user prints by using the receipt application, a serial number, a date, an address, and the like can be automatically printed.

Figure 17A:
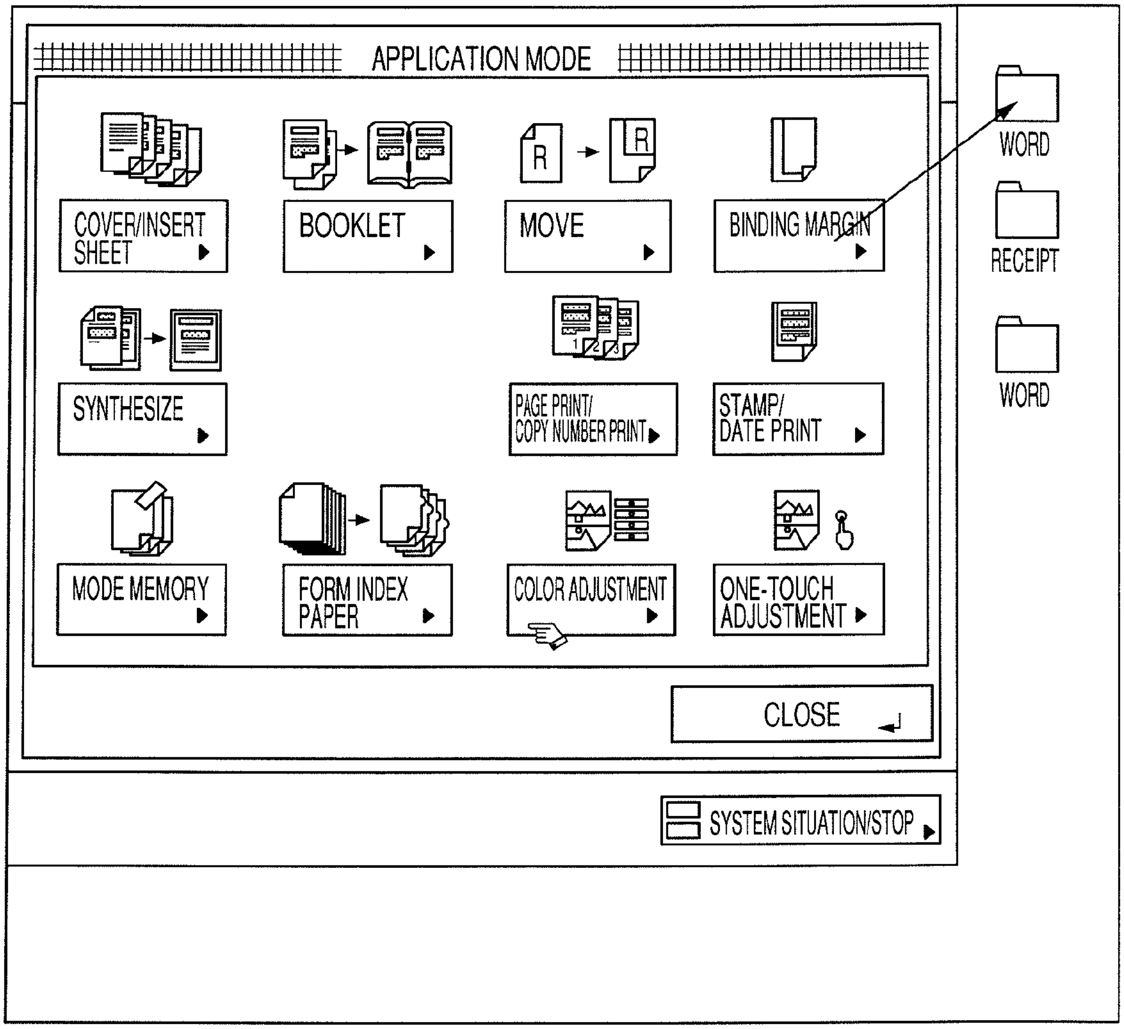
FIG. 17A is a diagram for describing an application mode allocation processing operation which is executed by an image processing apparatus according to a second embodiment of the invention.
Figure 17B:
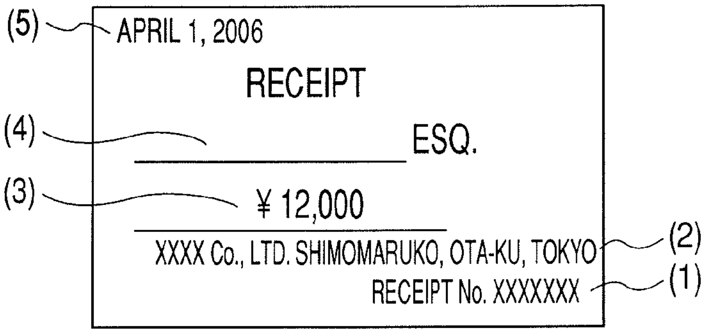
FIG. 17B is a diagram for describing the application mode allocation processing operation which is executed by the image processing apparatus according to the second embodiment of the invention.

FIGS. 17A to 17C are diagrams for describing an application mode allocation processing operation which is executed by an image processing apparatus according to the second embodiment of the invention.

In FIG. 17A, an operation display screen 1700 corresponds to the display screen for the application modes which can be executed by the MFP. This diagram relates to an example in which "Cover/insert sheet", "Booklet", "Move", "Binding margin", "Synthesize", "Page print/copy number print", "Stamp/date print", and the like can be set as application modes.

Specifically speaking, on this display screen, the user drags and drops the icons of the application modes to the folder of the applications which has already been registered in the DISK 112.

Thus, from a reference table illustrated in FIG. 17C, the controller 101 can discriminate that, for example, the application mode of the stamp/date print has been registered in the receipt application.

In this case, the controller 101 can print the date and the serial number formed by the stamp function to the designated positions in addition to the money amount on the receipt and the company name which have been formed according to the job formed by the receipt application. Thus, a receipt illustrated in FIG. 17B is printed onto the sheet which is fed from the designated cassette C1.

The serial number is managed by the controller 101 so that it is not validated at the time of the foregoing trial print.

Third Embodiment

The embodiment has been described above with respect to the case where the file in which the specific application was executed is processed by using one MFP.

However, in the office work, there is also a case where the same business is processed by using a plurality of MFPs. In such a case, the latest management information is shared by using the communicating function of each MFP. Thus, it is desirable that the controller 101 of each MFP controls the receipt printing process in an interlocking relationship manner in such a manner that, for example, even if a print request is made by one of the MFPs upon receipt printing, the correct serial numbers are synchronously printed at the time of the receipt printing.

Fourth Embodiment

A construction of data processing programs which can be read out by the information processing apparatus according to the invention will be described hereinbelow with reference to a memory map illustrated in FIG. 18.

FIG. 18 is a diagram for describing the memory map in a storing medium for storing the various data processing programs which can be read out by the information processing apparatus according to an embodiment the invention.

Although not particularly illustrated in the diagram, there is also a case where information for managing a program group which is stored in the storing medium, for example, version information, implementor's name, and the like are also stored and, information depending on the OS or the like of the program reading side, for example, icons for discriminating and displaying the programs and the like are also stored.

Further, data depending on the various programs has also been managed in the directory. There is also a case where a program for installing the various programs into the computer and, if the installing program has been compressed, a program for decoding the compressed program, and the like are also stored.

The functions shown in FIG. 16 in the embodiment may be executed by a host computer by a program which is installed from the outside. In such a case, naturally, the invention can be also applied to the case where an information group including the programs are supplied to an output apparatus by a storing medium such as CD-ROM, flash memory, FD, or the like or from an external storing medium through the network.

Naturally, the objects of the invention are accomplished by a method whereby the storing medium in which program codes of software for realizing the functions of the embodiments mentioned above have been stored is supplied to a system or an apparatus and a computer (or a CPU or an MPU) of the system or apparatus reads out and executes the program codes stored in the storing medium.

In this case, the program codes themselves read out of the storing medium realize the novel functions of the invention and the storing medium in which the program codes have been stored constructs the invention.

Therefore, any one of the program forms such as object code, program which is executed by an interpreter, script data which is supplied to the OS, and the like can be used so long as they have the functions of the programs.

As a storing medium for supplying the programs, a flexible disk, a hard disk, an optical disk, a magnetooptic disk, an MO, a CD-ROM, a CD-R, a CD-RW, a magnetic tape, a nonvolatile memory card, a ROM, a DVD, or the like can be used.

In this case, the program codes themselves read out of the storing medium realize the functions of the embodiments mentioned above and the storing medium in which the program codes have been stored constructs the invention.

As another program supplying method, the program can be also supplied by a method whereby a client computer is connected to Homepage of the Internet by using a browser of the client computer, the computer programs themselves of the invention are downloaded from the Homepage or the compressed file including an automatic installing function is downloaded into the recording medium such as a hard disk or the like. The program supplying method can be also realized by a method whereby the program codes constructing the programs of the invention are divided into a plurality of files and the divided files are downloaded from different Homepages. That is, a WWW server, an ftp server, and the like for allowing a plurality of users to download the program file for realizing the functional processes of the invention by the computer are also incorporated in the scope of the invention.

The program supplying method can be also realized by a method whereby the programs of the invention are encrypted and stored into the storing medium such as a CD-ROM or the like and distributed to the users, the users who can satisfy predetermined conditions are allowed to download key information for decrypting the encryption from the Homepage through the Internet, and the encrypted programs are executed by using the key information and installed into the computer.

Naturally, the invention incorporates not only the case where the functions of the embodiments mentioned above are realized by a method whereby the computer executes the read-out program codes but also the case where, for example, the OS (Operating System) or the like which is operating in the computer executes a part or all of actual processes based on instructions of the program codes and the functions of the embodiments mentioned above are realized by those processes.

Further, naturally, the invention also incorporates the case where the program codes read out of the storing medium are written into a memory provided for a function expanding board inserted to the computer or a function expanding unit connected to the computer, thereafter, a CPU or the like equipped for the function expanding board or the function expanding unit executes a part or all of actual processes based on instructions of the program codes, and the functions of the embodiments mentioned above are realized by those processes.

The invention is not limited to the foregoing embodiments but many various modifications (including organic combinations of the embodiments) are possible based on the spirit of the invention and they are not excluded from the scope of the invention.

Although the various examples and embodiments of the invention have been illustrated and described above, it will be understood by those skilled in the art that the spirit and scope of the invention are not limited to the specific description in the specification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-243891, filed Sep. 8, 2006, which is hereby incorporated by reference herein in its entirety.

What is claimed is:

1. An image processing apparatus for executing an image process by using a sheet feeding unit or a sheet discharging unit selected from a plurality of sheet feeding units or a plurality of sheet discharging units, the image processing apparatus comprising:

a forming unit adapted to form a print job by using an application;

a storing unit adapted to store attribute information for specifying the sheet feeding unit or the sheet discharging unit to correspond to the application;

a control unit adapted to control the selection of the sheet feeding unit or the sheet discharging unit to output the print job based on the attribute information stored in the storing unit; and an attribute management table adapted to store application information for deciding an applying method of the attribute information for the storing unit, wherein, based on the application information stored in the attribute management table, the control unit determines whether the sheet feeding unit or the sheet discharging unit is to be selected to output the print job based on the attribute information stored in the storing unit in place of a print attribute designated by the print job, and wherein the application information is at least one of dedicated, default, OFF, and exception.

2. An image processing apparatus according to claim 1, further comprising the plurality of sheet feeding units.

3. An image processing apparatus according to claim 1, further comprising the plurality of sheet discharging units.

4. An image processing apparatus according to claim 1, wherein a print mode which is used for each application is registered as an attribute in the storing unit.

5. An image processing apparatus according to claim 4, wherein the print mode is a stamp mode for printing a date and a serial number onto a recording medium.

6. An image processing apparatus according to claim 5, further comprising an output control unit adapted to allow the date and the serial number to be output from an output unit onto the recording medium which is fed from the sheet feeding unit based on the print mode.

7. An image processing apparatus for executing an image process by using a sheet feeding unit or a sheet discharging unit selected from a plurality of sheet feeding units or a plurality of sheet discharging units, the image processing apparatus comprising:

a forming unit adapted to form a print job by using an application;

a storing unit adapted to store attribute information for specifying the sheet feeding unit or the sheet discharging unit to correspond to the application; and a control unit adapted to control the selection of the sheet feeding unit or the sheet discharging unit to output the print job based on the attribute information stored in the storing unit, wherein a first symbol corresponding to the application and a second symbol corresponding to the sheet feeding unit or the sheet discharging unit are displayed as graphical user interfaces onto an operation unit of the image processing apparatus, and an associating process of the application and the sheet feeding unit or the sheet discharging unit is executed in response to that the first symbol and the second symbol have been overlaid by a drag-and-drop.

8. A method for an image processing apparatus including a plurality of sheet feeding units or a plurality of sheet discharging units, the method comprising:

receiving a print job generated using an application;

storing attribute information for specifying one of the sheet feeding units or one of the sheet discharging units to correspond to the application; and controlling a selection of one of the sheet feeding units or one of the sheet discharging units to execute the print job based on the stored attribute information, wherein an attribute management table is provided to store application information for specifying an applying method of the stored attribute information, wherein controlling includes determining, based on the application information stored in the attribute management table, whether one of the sheet feeding unit or one of the sheet discharging unit is to be selected to execute the print job based on the stored attribute information in place of a print attribute designated by the print job, and wherein the application information is at least one of dedicated, default, OFF, and exception.

9. A method according to claim 8, wherein the image processing apparatus has the plurality of sheet feeding units.

10. A method according to claim 8, wherein the image processing apparatus has the plurality of sheet discharging units.

11. A method according to claim 8, wherein storing includes registering as an attribute a print mode which is used for each application that can be installed.

12. A method according to claim 11, wherein the print mode is a stamp mode for printing a date and a serial number onto a recording medium.

13. A method according to claim 12, further comprising allowing the date and the serial number to be output from an output unit onto the recording medium which is fed from the sheet feeding unit based on the print mode.

14. A non-transitory computer-readable storing medium storing a computer program for causing a computer to execute the method according to claim 8.

15. A method for an image processing apparatus including a plurality of sheet feeding units or a plurality of sheet discharging units, the method comprising:

receiving a print job generated using an application;

storing attribute information for specifying one of the sheet feeding units or one of the sheet discharging units to correspond to the application; and controlling a selection of one of the sheet feeding units or one of the sheet discharging units to execute the print job based on the stored attribute information, wherein a first symbol corresponding to the application and a second symbol corresponding to the sheet feeding unit or the sheet discharging unit are displayed as graphical user interfaces to an operation unit of the image processing apparatus, and an associating process of the application and the sheet feeding unit or the sheet discharging unit is executed in response to that the first symbol and the second symbol have been overlaid by a drag-and-drop.

16. A non-transitory computer-readable storing medium storing a computer program for causing a computer to execute the method according to claim 15.

* * * * *